United States Patent
Toya et al.

(10) Patent No.: US 7,969,485 B2
(45) Date of Patent: Jun. 28, 2011

(54) SOLID-STATE IMAGING DEVICE AND CAMERA

(75) Inventors: Hiroshi Toya, Nara (JP); Yasuyuki Endoh, Hyogo (JP)

(73) Assignee: Panasonic Corporation, Osaka (JP)

( * ) Notice: Subject to any disclaimer, the term of this patent is extended or adjusted under 35 U.S.C. 154(b) by 586 days.

(21) Appl. No.: 12/026,090

(22) Filed: Feb. 5, 2008

(65) Prior Publication Data
US 2008/0284887 A1 Nov. 20, 2008

(30) Foreign Application Priority Data

May 15, 2007 (JP) .................. 2007-129266
May 15, 2007 (JP) .................. 2007-129267

(51) Int. Cl.
*H04N 5/235* (2006.01)
*H04N 3/14* (2006.01)
(52) U.S. Cl. ............... 348/230.1; 348/281; 257/204
(58) Field of Classification Search .......... 348/230.1, 348/281–284, 302
See application file for complete search history.

(56) References Cited

U.S. PATENT DOCUMENTS

| 4,959,723 | A | | 9/1990 | Hashimoto | |
|---|---|---|---|---|---|
| 6,124,888 | A | * | 9/2000 | Terada et al. | 348/302 |
| 6,797,960 | B1 | * | 9/2004 | Spartiotis et al. | 250/370.09 |
| 7,345,269 | B2 | * | 3/2008 | Lee et al. | 250/208.1 |
| 7,462,834 | B2 | * | 12/2008 | Masazumi | 250/370.09 |
| 7,724,301 | B2 | * | 5/2010 | Alakarhu | 348/362 |
| 2004/0228452 | A1 | * | 11/2004 | Rinaldi et al. | 378/207 |
| 2006/0038888 | A1 | * | 2/2006 | Kotouda | 348/211.14 |

FOREIGN PATENT DOCUMENTS

| JP | 1-122277 | 5/1989 |
|---|---|---|
| JP | 2006-93816 | 4/2006 |

* cited by examiner

*Primary Examiner* — Hung H Lam
(74) *Attorney, Agent, or Firm* — McDermott Will & Emery LLP

(57) ABSTRACT

A solid-state imaging device comprises a pixel array including a plurality of pixels arranged in rows and columns, and a readout unit operable to read out pixel signals of the pixels included in the pixel array row by row. The readout unit (i) reads out pixel signals of a row of pixels in column order of the pixel array during a horizontal readout period, except during a readout-standby period that is within the horizontal readout period, and (ii) suspends reading out the pixel signals of the row of pixels in the column order during the readout-standby period.

5 Claims, 37 Drawing Sheets

SOLID-STATE IMAGING DEVICE AND CAMERA

BACKGROUND OF THE INVENTION (1) Field of the Invention

The present invention relates to a solid-state imaging device used for a digital camera and the like, and in particular to technology for suppressing image noise in an MOS-type solid-state imaging device.

(2) Description of the Related Art

In general, an MOS-type solid-state imaging device comprises (i) a pixel array that includes a plurality of pixels arranged in rows and columns, and (ii) a signal processing unit that parallelly processes and stores pixel signals of a row of pixels included in the pixel array. During a horizontal blanking period, the signal processing unit parallelly processes pixel signals of a row of pixels and stores these processed pixel signals. Then during a horizontal readout period that follows the horizontal blanking period, these processed pixel signals are read out from the signal processing unit, one by one, in column order of the pixel array. By repeating the above-described set of operations for each row in a frame, pixel signals for one frame of pixels can be read out (e.g., see Japanese Laid-Open Patent Application No. 1-122277).

In recent years, a solid-state imaging device has been used not only for a general digital camera, but also for an in-vehicle camera, a surveillance camera, and various other systems. Consequently, demand is growing for a solid-state imaging device with specifications for functions that have never been available conventionally, such as an ultra-high-speed shutter and an ultra-high-speed readout. While working on the development of a camera under such demand, inventors of the present invention discovered that depending on specifications, noise occurs periodically during every horizontal readout period, possibly causing the following image noise to appear.

FIG. 37 is a diagram for explaining image noise and the cause of the image noise.

FIG. 37 shows an electronic shutter pulse as an example of the cause of the periodic image noise. The electronic shutter pulse is one of drive pulses that are mutually applied, via row-signal lines, to every row of pixels included in the pixel array. Conventionally, the electronic shutter pulse has been applied during the horizontal blanking period (HBLK). In the example of FIG. 37, however, the electronic shutter pulse is applied during a predetermined period within the horizontal readout period, in order to finely adjust an ultra-high-speed shutter and an exposure time. If the electronic shutter pulse is applied during the horizontal readout period as just described, the electronic shutter pulse triggers noise, resulting in the noise entering some of the pixel signals by way of a series of connected circuits. As the noise repeatedly occurs in every horizontal readout period, an image noise 71 appears notably as a vertical line or a vertical belt in a captured image.

It should be noted that the electronic shutter pulse is one example of the cause of the periodic noise. Depending on specifications, pulses other than the electronic shutter pulse may cause such periodic noise.

SUMMARY OF THE INVENTION

In view of the above problem, the present invention aims to provide a solid-state imaging device and a camera that can suppress image noise in a captured image, even when periodic noise occurs during a horizontal readout period.

The above object is fulfilled by a solid-state imaging device comprising: a pixel array including a plurality of pixels arranged in rows and columns; and a readout unit operable to read out pixel signals of the pixels included in the pixel array row by row, wherein the readout unit (i) reads-out pixel signals of a row of pixels in column order of the pixel array during a horizontal readout period, except during a readout-standby period that is within the horizontal readout period, and (ii) suspends reading out the pixel signals of the row of pixels in the column order during the readout-standby period. Here, the sentence "reads out pixel signals of a row of pixels in column order of the pixel array" means that, assuming the columns in the pixel array are numbered, the pixel signals of the row of pixels are read out in order of the numbers.

According to the above structure, the readout of the pixel signals in the column order is (i) conducted during the horizontal readout period, except during the readout-standby period, and (ii) suspended during the readout-standby period. Provided that periodic noise is expected to occur for a certain period, it is possible to suppress image noise in a captured image by suspending the readout of the pixel signals. Therefore, the readout-standby period may include at least a period for which noise affecting quality of the pixel signals is expected to occur.

The readout unit may include: a shift register operable to (i) store therein selective data that selects a target column which is one of the columns in the pixel array, and (ii) selectively shift the selective data in one of (a) a forward direction that corresponds to the column order and (b) a reverse direction that is opposite to the forward direction; an output subunit operable to externally output, out of the pixel signals of the row of pixels, a pixel signal of one of the row of pixels that is in the target column selected by the selective data stored in the shift register; and a shift register control subunit operable to cause the shift register to shift the selective data in (i) the forward direction during the horizontal readout period, except during the readout-standby period, (ii) the reverse direction during a period that is equivalent to half of the readout-standby period, and (iii) the forward direction during a period that is equivalent to the other half of the readout-standby period.

The readout unit may include: a shift register operable to (i) store therein selective data that selects a target column which is one of the columns in the pixel array, and (ii) selectively perform one of (a) shifting the selective data in a forward direction that corresponds to the column order and (b) pausing the shifting of the selective data; an output subunit operable to externally output, out of the pixel signals of the row of pixels, a pixel signal of one of the row of pixels that is in the target column selected by the selective data stored in the shift register; and a shift register control subunit operable to cause the shift register to (i) shift the selective data in the forward direction during the horizontal readout period, except during the readout-standby period, and (ii) pause the shifting of the selective data during the readout-standby period.

With the above structures, it is possible to suspend the readout of the pixel signals in the column order while applying a clock pulse to the shift register during the readout-standby period. The readout of the pixel signals in the column order can be suspended by pausing the application of the clock pulse to the shift register; this, however, results in the following drawbacks. If the application of the clock pulse to the shift register is paused, an abrupt load change occurs upon resuming the application of the clock pulse, causing the power supply voltage to change. As a consequence, there is a possibility that noise may occur immediately after resuming the application of the clock pulse. In contrast, the above structures allow suspending the readout of the pixel signals in the column order while applying the clock pulse to the shift register. Hence, the above structures do not have the stated drawbacks, and is more effective in suppressing image noise.

The output subunit may externally output the pixel signal of one of the row of pixels that is in the target column, upon receiving an input of the selective data stored in the shift register, and the readout unit may further include a non-selective data input subunit operable to, during the readout-standby period, input non-selective data instead of the selective data to the output subunit, the non-selective data selecting none of the columns in the pixel array.

With the above structure, none of the pixel signals are read out from the solid-state imaging device during the readout-standby period. This makes it possible to reduce the power consumed in a circuit for reading out the pixel signals and in an image processing system.

It is also permissible that during the horizontal readout period, the readout unit reads out the pixel signals of the row of pixels that have been stored in one of a first memory and a second memory, while concurrently storing pixel signals of another row of pixels into the other one of the first memory and the second memory, and that the readout-standby period includes at least a period for which noise is expected to occur caused by an operation to store the pixel signals of another row of pixels.

In order to efficiently read out all pixel signals in one frame, some solid-state imaging devices have a specification for a function that allows reading out pixel signals of a row of pixels stored in a row memory during a horizontal readout period, while concurrently storing, into the row memory, pixel signals of another row of pixel signals that are to be read out during the next horizontal readout period. This specification gives rise to the possibility that noise may occur, caused by the operation to store pixel signals. However, the above-described structure makes it possible to suppress image noise in a captured image by suspending the readout of pixel signals, even in a case where a solid-state imaging device having the stated specification is used.

A camera pertaining to the present invention includes a solid-state imaging device and an image processing unit, wherein (i) the solid-state imaging device comprises: a pixel array including a plurality of pixels arranged in rows and columns; and a readout unit operable to read out pixel signals of the pixels included in the pixel array row by row, (ii) the readout unit (a) reads out pixel signals of a row of pixels in column order of the pixel array during a horizontal readout period, except during a readout-standby period that is within the horizontal readout period, and (b) suspends reading out the pixel signals of the row of pixels in the column order during the readout-standby period, and (iii) the signal processing unit discards, out of the pixel signals of the row of pixels read out by the readout unit, one or more pixel signals that are read out during the readout-standby period.

It is possible to suppress image noise from appearing as a vertical line or a vertical belt in a captured image, by discarding one or more pixel signals that are read out during the readout-standby period as just described above.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

First Embodiment

Figure 1:
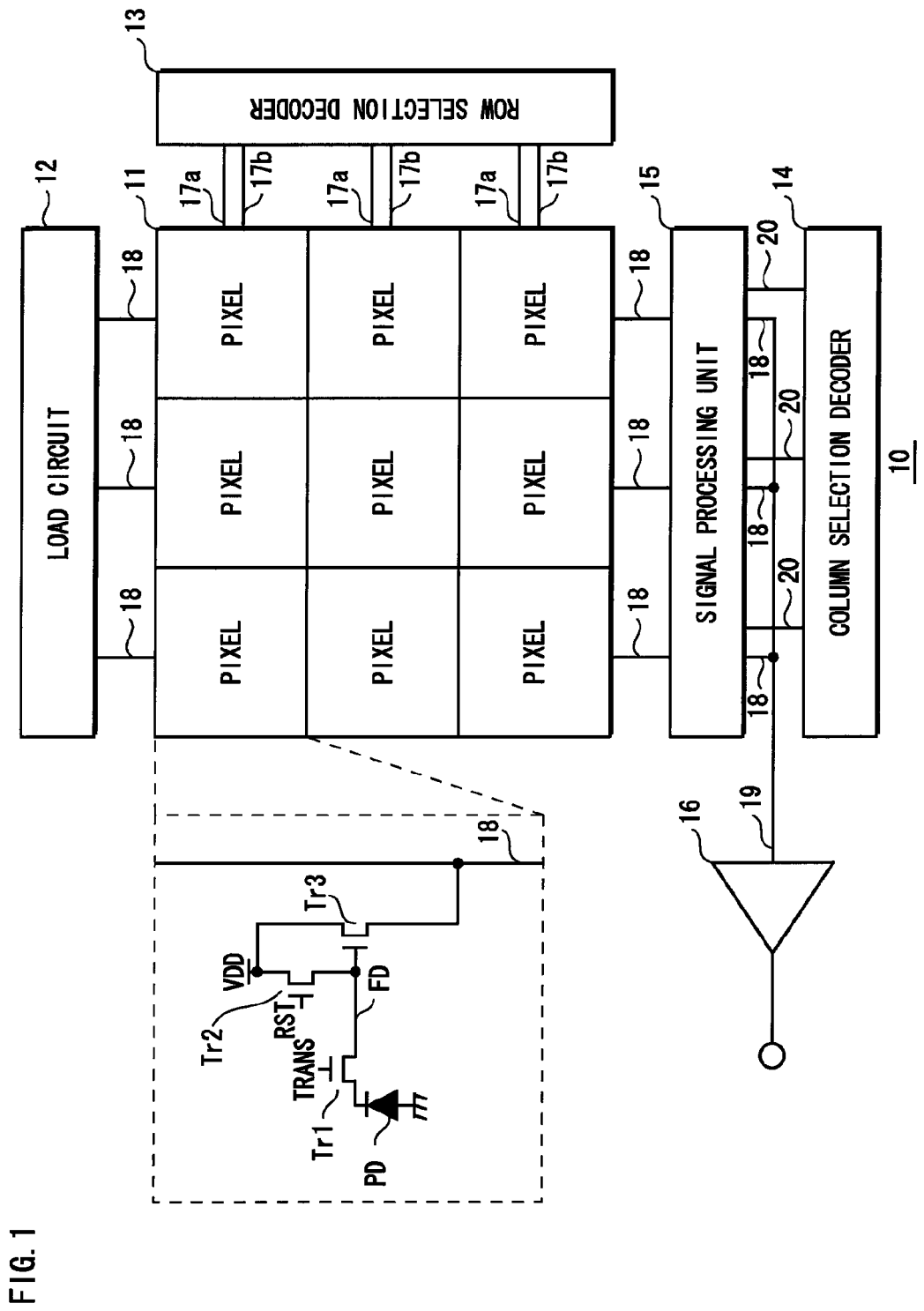
FIG. 1 shows a general structure of a solid-state imaging device pertaining to a first embodiment of the present invention.

FIG. 1 shows a general structure of a solid-state imaging device pertaining to the first embodiment of the present invention.

A solid-state imaging device 10 includes a pixel array 11, a load circuit 12, a row selection decoder 13, a column selection decoder 14, a signal processing unit 15, and an output amplifier 16.

The pixel array 11 includes a plurality of pixels that are arranged two-dimensionally. Each pixel comprises a photodiode PD, a floating diffusion FD, and transistors Tr1, Tr2 and Tr3. The gates of the transistors Tr1 and Tr2 are connected to row-signal lines 17a and 17b, respectively. The gate of the transistor Tr3 is connected to the floating diffusion FD, and the source of the transistor Tr3 is connected to a column-signal line 18.

By receiving various types of drive pulses from an external timing control unit, the load circuit 12, the row selection decoder 13, the column selection decoder 14, the signal processing unit 15 and the output amplifier 16 function as a readout unit that reads out pixel signals of the pixels included in the pixel array 11, row by row.

In the first embodiment, main features of the present invention lie in the structure of the column selection decoder 14 and in a driving method for the solid-state imaging device 10. Other features are common technologies, and the descriptions thereof are thus omitted.

Figure 2:
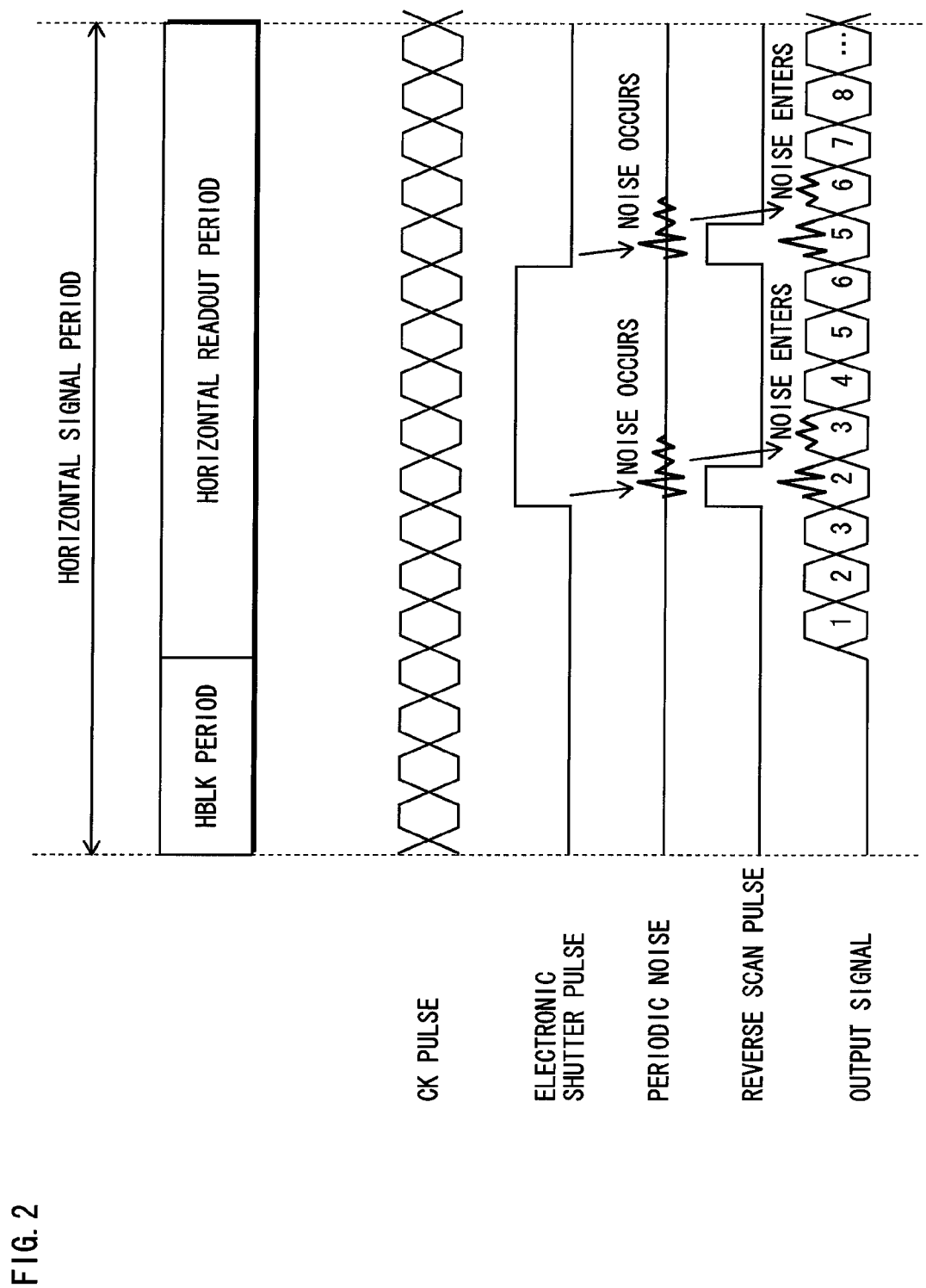
FIG. 2 shows a readout-standby operation pertaining to the first embodiment of the present invention, which is to suspend a readout of pixel signals in column order.

FIG. 2 shows a readout-standby operation pertaining to the first embodiment of the present invention, which suspends the readout of pixel signals in column order.

The numbers shown along an output signal are numbers assigned to the columns, each of which is to be selected as a target column by the column selection decoder 14. In the first embodiment, the column selection decoder 14 includes a shift register that can shift in the forward direction, which corresponds to the column order of the pixel array, or in the reverse direction opposite to the forward direction. The shift register shifts in the forward direction when the level of a reverse scan pulse is low, and in the reverse direction when the level of the reverse scan pulse is high. The level of the reverse scan pulse is designed to be (i) low during the horizontal readout period except during the readout-standby period, (ii) high during the first half of the readout-standby period, and (iii) low during the last half of the readout-standby period. With the reverse scan pulse designed in the above-described manner, it is possible to read out a row of pixel signals in column order during the horizontal readout period except during the readout-standby period, and to suspend the readout of pixel signals in column order during the readout-standby period.

FIG. 2 exemplarily shows noise entering pixel signals from the fourth to fifth pixel cycles owing to the rise of the electronic shutter pulse, and from the ninth to tenth pixel cycles owing to the fall of the electronic shutter pulse. Here, each pixel cycle corresponds to a period required to read out a pixel signal of one pixel. In the example of FIG. 2, pixel signals in the second and third columns are read out again in the fourth and fifth pixel cycles, respectively. This way, the readout of pixel signals in the fourth column and onward is suspended during the readout-standby period, and is resumed when the readout-standby period has passed (i.e., in the sixth pixel cycle and onward). Likewise, pixel signals in the fifth and sixth column are read out again in the ninth and tenth pixel cycles, respectively. This way, the readout of pixel signals in the seventh column and onward is suspended during the readout-standby period, and is resumed when the readout-standby period has passed (i.e., in the eleventh pixel cycle and onward).

As set forth, the readout of pixel signals in column order is conducted during the horizontal readout period except during the readout-standby period, and is suspended during the readout-standby period. Provided that noise is expected to occur for a certain period and that the noise affects the quality of the pixel signals, it is possible to suppress image noise in a captured image by suspending the stated readout during that certain period.

Figure 3:
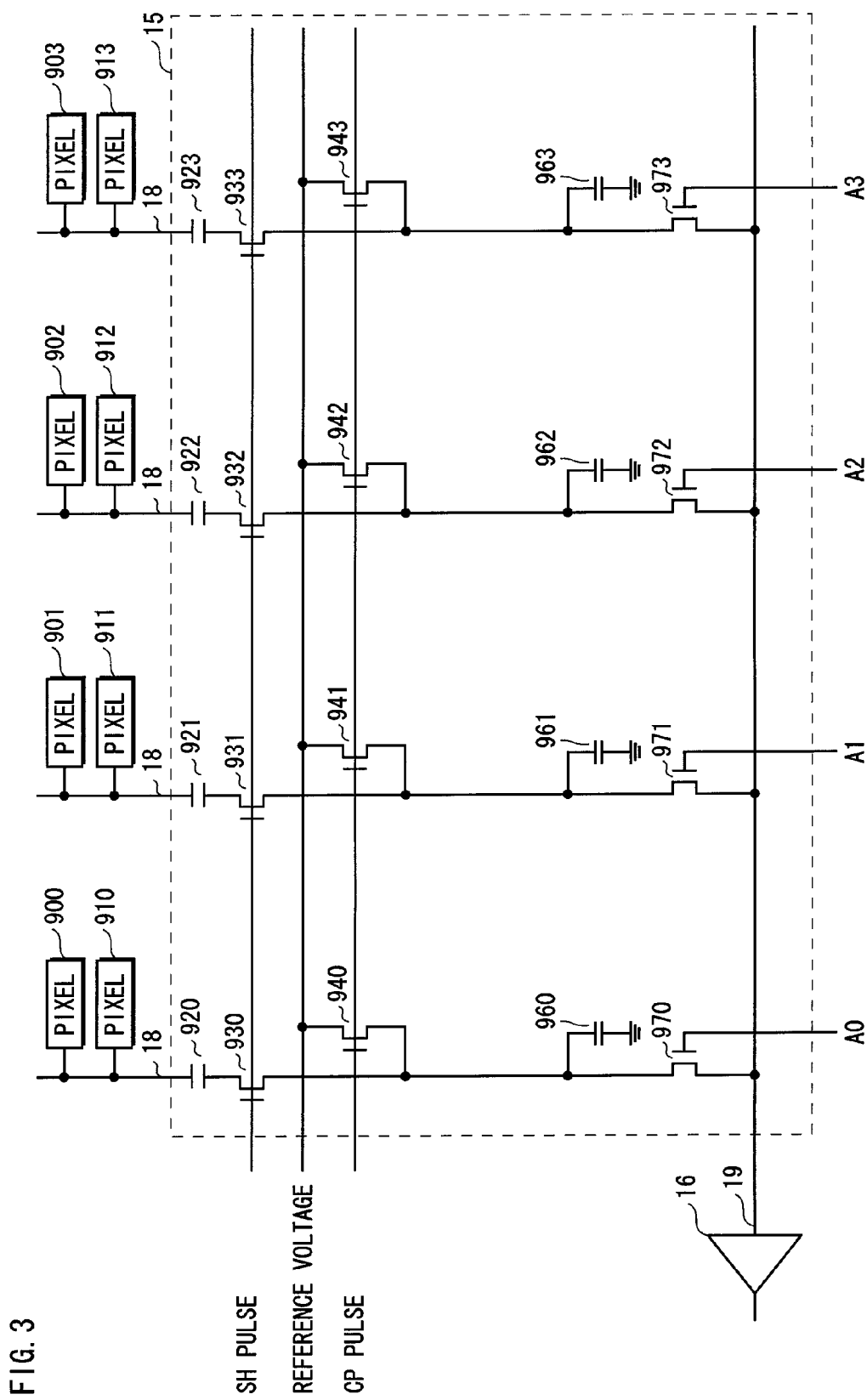
FIG. 3 shows a structure of a signal processing unit 15 pertaining to the first embodiment of the present invention.

FIG. 3 shows the structure of the signal processing unit 15 pertaining to the first embodiment of the present invention.

The signal processing unit 15 has multiple circuits of the same structure, with each circuit being assigned to a different one of the columns. For example, in observing the first column, a capacitor 921 and transistors 931 and 971 are coupled to the column-signal line 18. The column-signal line 18 has a node to which the transistors 931 and 971 are connected; this node is further connected to a reference voltage supply via a transistor 941, and to a ground via a capacitor 961.

A group of capacitors (960, 961, 962, 963, etc.) functions as a row memory that stores a row of pixel signals. A group of transistors (970, 971, 972, 973, etc.), a horizontal signal line 19 and the output amplifier 16 function as an output subunit that externally outputs one of the row of pixel signals stored in the row memory.

Figure 4:
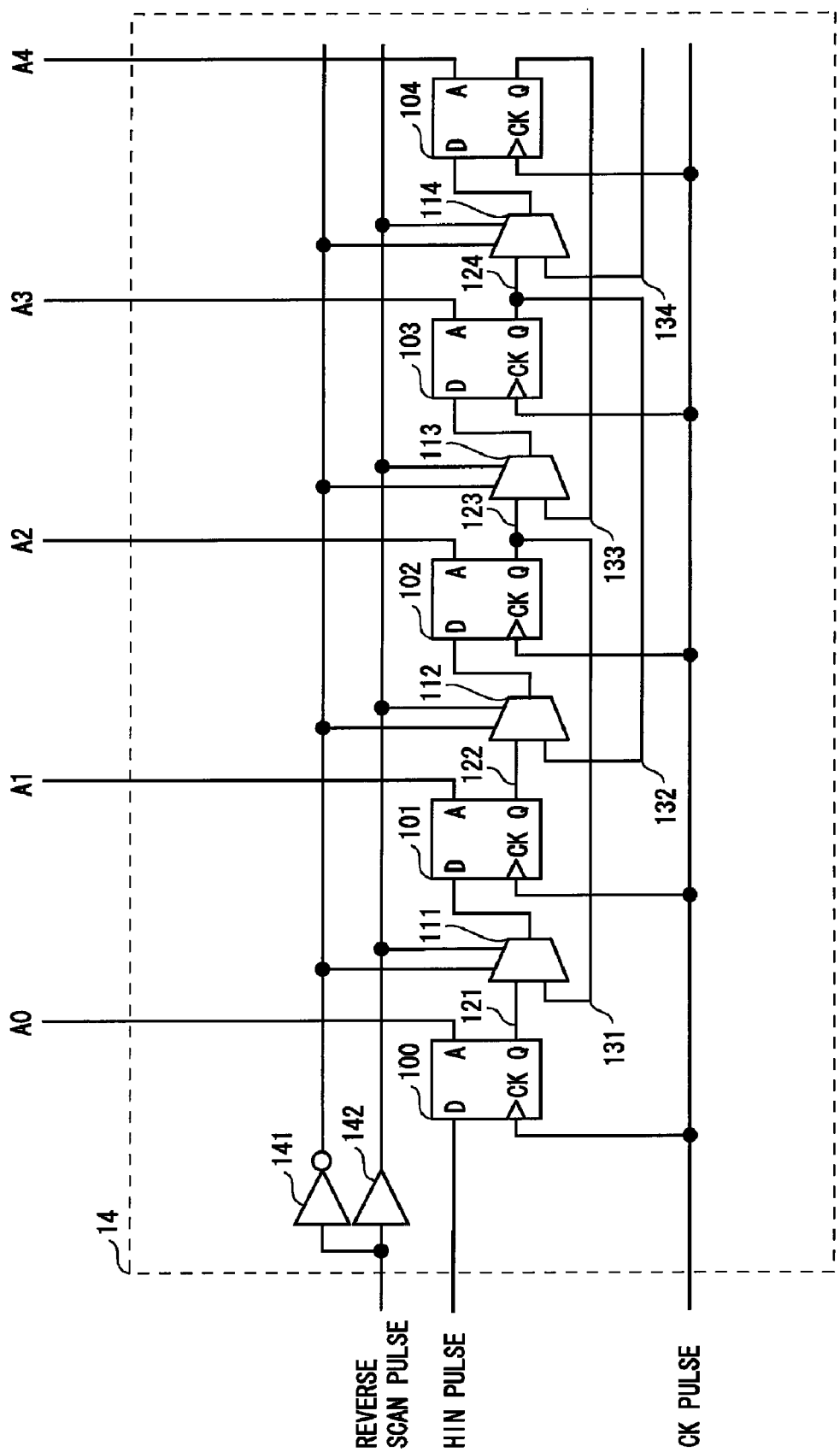
FIG. 4 shows a structure of a column selection decoder 14 pertaining to the first embodiment of the present invention.
Figure 5:
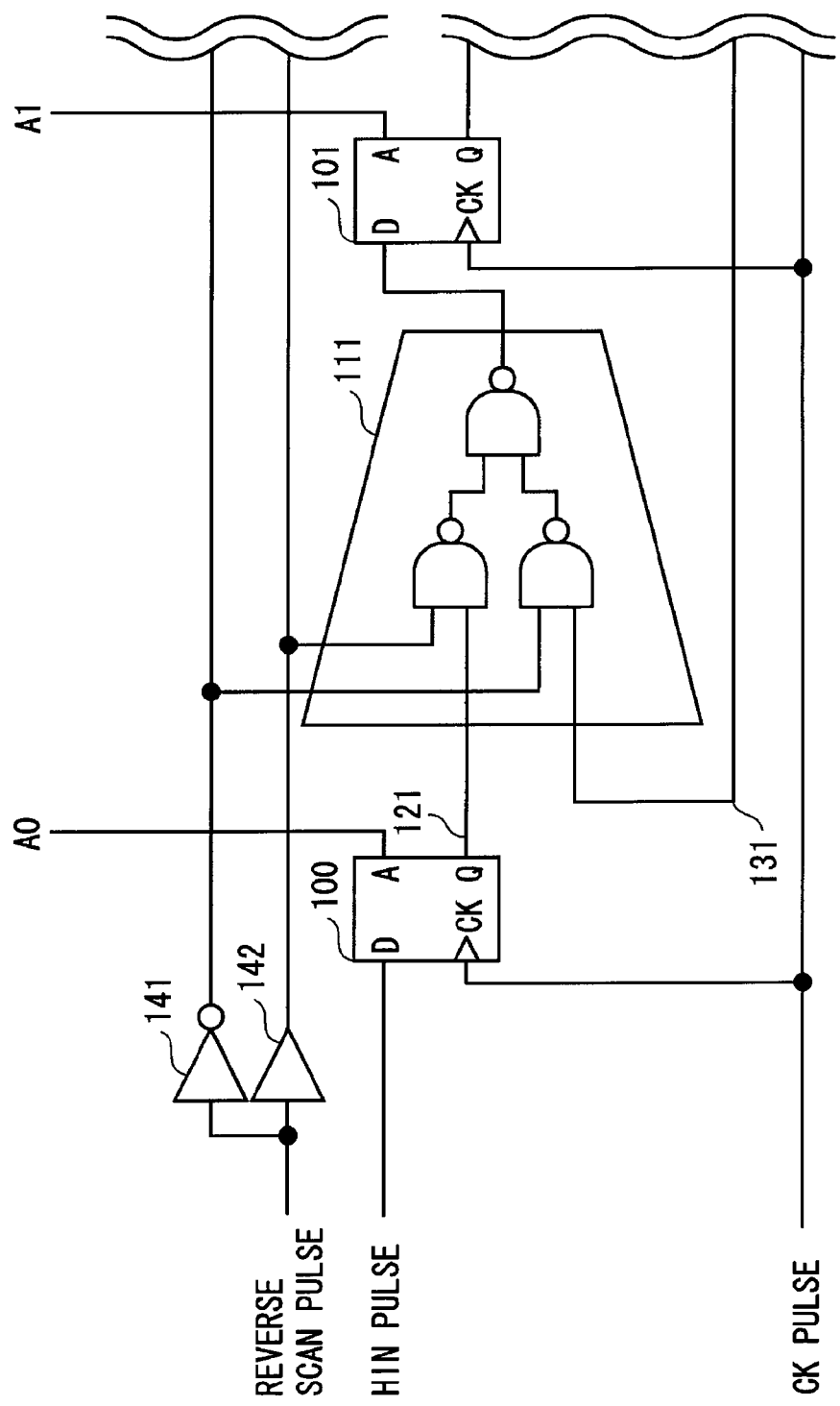
FIG. 5 shows another structure of the column selection decoder 14 pertaining to the first embodiment of the present invention.

FIGS. 4 and 5 each show the structure of the column selection decoder 14 pertaining to the first embodiment of the present invention.

The column selection decoder 14 has multiple circuits of the same structure, with each circuit being assigned to a different one of the columns. For example, in observing the first column, an input terminal (D) of a flip-flop 101 is connected via a selector 111 to output terminals (Q) of flip-flops 100 and 102. An output terminal (A) of the flip-flop 101 is connected via a selective signal line 20 to the signal processing unit 15. A clock pulse is inputted to a clock terminal (CK) of the flip-flop 101. The selector 111 selectively connects (i) the output terminal (Q) of the flip-flop 100 to the input terminal (D) of the flip-flop 101 when the reverse scan pulse level is low, and (ii) the output terminal (Q) of the flip-flop 102 to the input terminal (D) of the flip-flop 101 when the reverse scan pulse level is high. With each column having the same structure described above, the shift register can shift in both the forward direction and the reverse direction.

Figure 6:
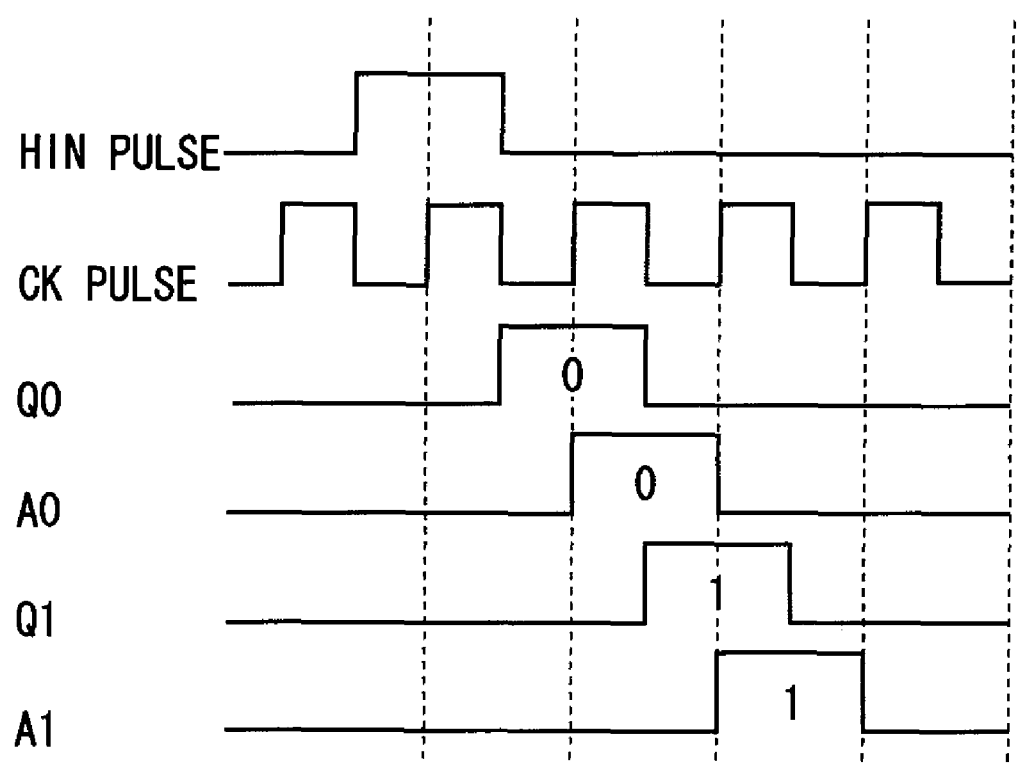
FIG. 6 shows a relationship among output signals that are outputted from output terminals (Q and A) of flip-flops.

FIG. 6 shows a relationship among output signals that are outputted from output terminals (Q and A) of flip-flops.

The example of FIG. 6 shows the shift register shifting in the forward direction in synchronization with the clock pulse. Given that a cycle of the clock pulse repeats, the output signal (A0) is one-half cycle behind the other output signal (Q0).

Figure 7:
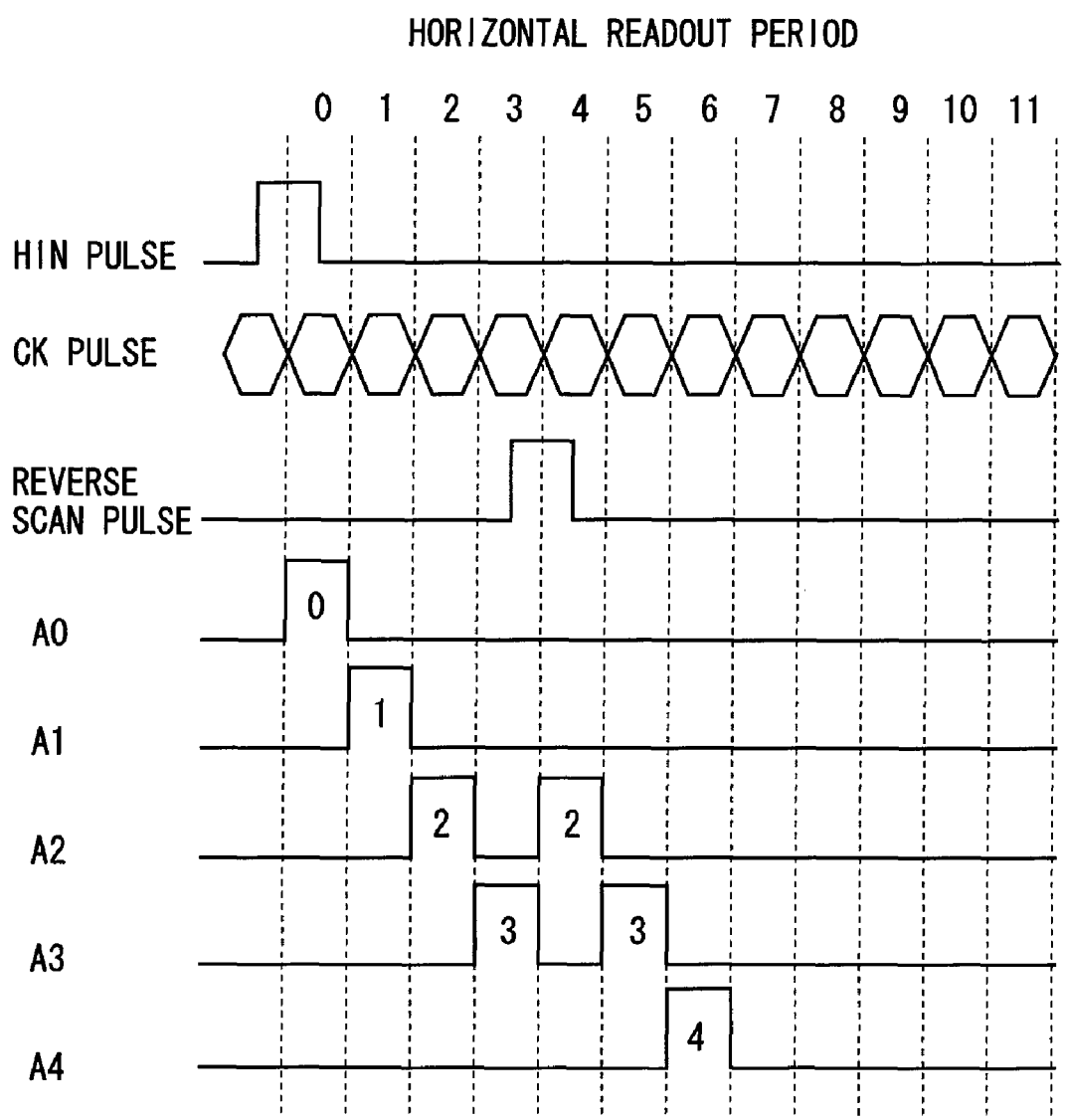
FIG. 7 shows an operation of the column selection decoder 14 pertaining to the first embodiment of the present invention.

FIG. 7 shows an operation of the column selection decoder 14 pertaining to the first embodiment of the present invention.

The column selection decoder 14 starts a shift operation upon data input (HIN pulse) that works as a trigger. As shown in FIG. 7, the column selection decoder 14 causes the shift register to shift in the forward direction when the reverse scan pulse level is low, and in the reverse direction when the reverse scan pulse level is high. In observing one section (e.g., the first section) of the horizontal readout period, the only output signal whose level is high is an output signal A1; the levels of other output signals A0, A2, A3, A4, etc. are low. An assembly of these output signals is selective data that selects one of the columns constituting the pixel array 11.

With the structures and operation shown in FIGS. 3 through 7, it is possible to not only read out the pixel signals in column order, but also suspend such a readout of the pixel signals in column order, as shown in FIG. 2.

Figure 8:
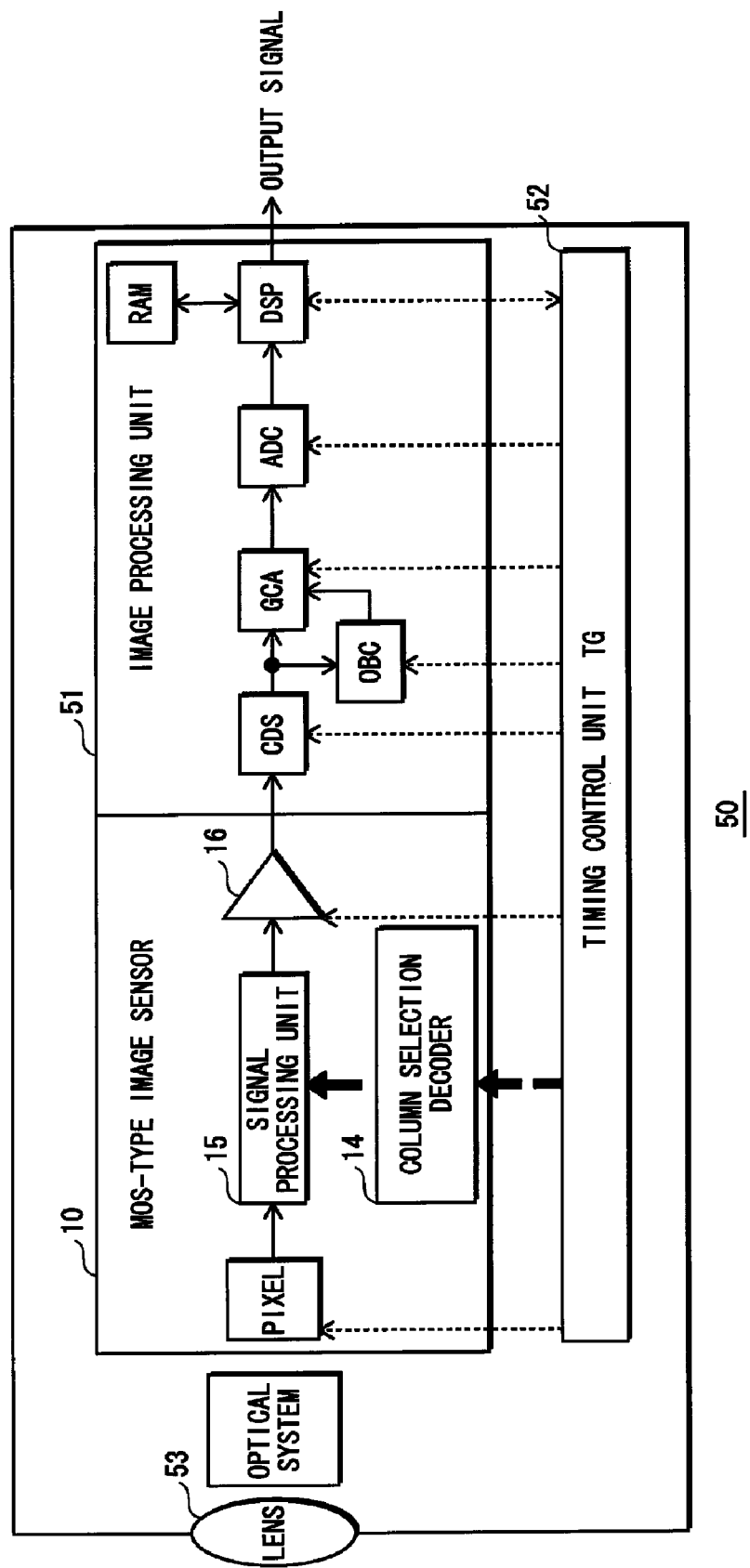
FIG. 8 shows a structure of a camera pertaining to the first embodiment of the present invention.

FIG. 8 shows the structure of a camera pertaining to the first embodiment of the present invention.

A camera 50 includes a solid-state imaging device 10, an image processing unit 51, a timing control unit 52, and an optical system 53 (e.g., a lens). The timing control unit 52 applies control signals to functional components of the solid-state imaging device 10 and the image processing unit 51. Among all subunits of the timing control unit 52, especially a signal generation subunit that generates signals for driving the shift register (i.e., the clock pulse, the reverse scan pulse, and the HIN pulse) functions as a shift register control subunit.

It is the case of the first embodiment that, as shown in FIG. 2, pixel signals that have already been read out are read out again during the readout-standby period. According to the structure of the first embodiment, each pixel signal is read out by "destructive readout"; accordingly, its signal level attained from the first-time readout is different from that attained from the second-time readout, rendering the latter pixel signal unreliable. For this reason, the image processing unit 51 discards, among all the pixel signals read out by the solid-state imaging device 10, pixel signals that are read out during the readout-standby period. This can suppress image noise from appearing as a vertical line or a vertical belt in a captured image. It should be noted that in order to perform the "non-destructive readout", the signal processing unit 15 needs to have a mechanism for storing signal levels before and after reading out the pixel signals. In this case, it is allowable to use pixel signals that are read out during the readout-standby period.

Figure 9:
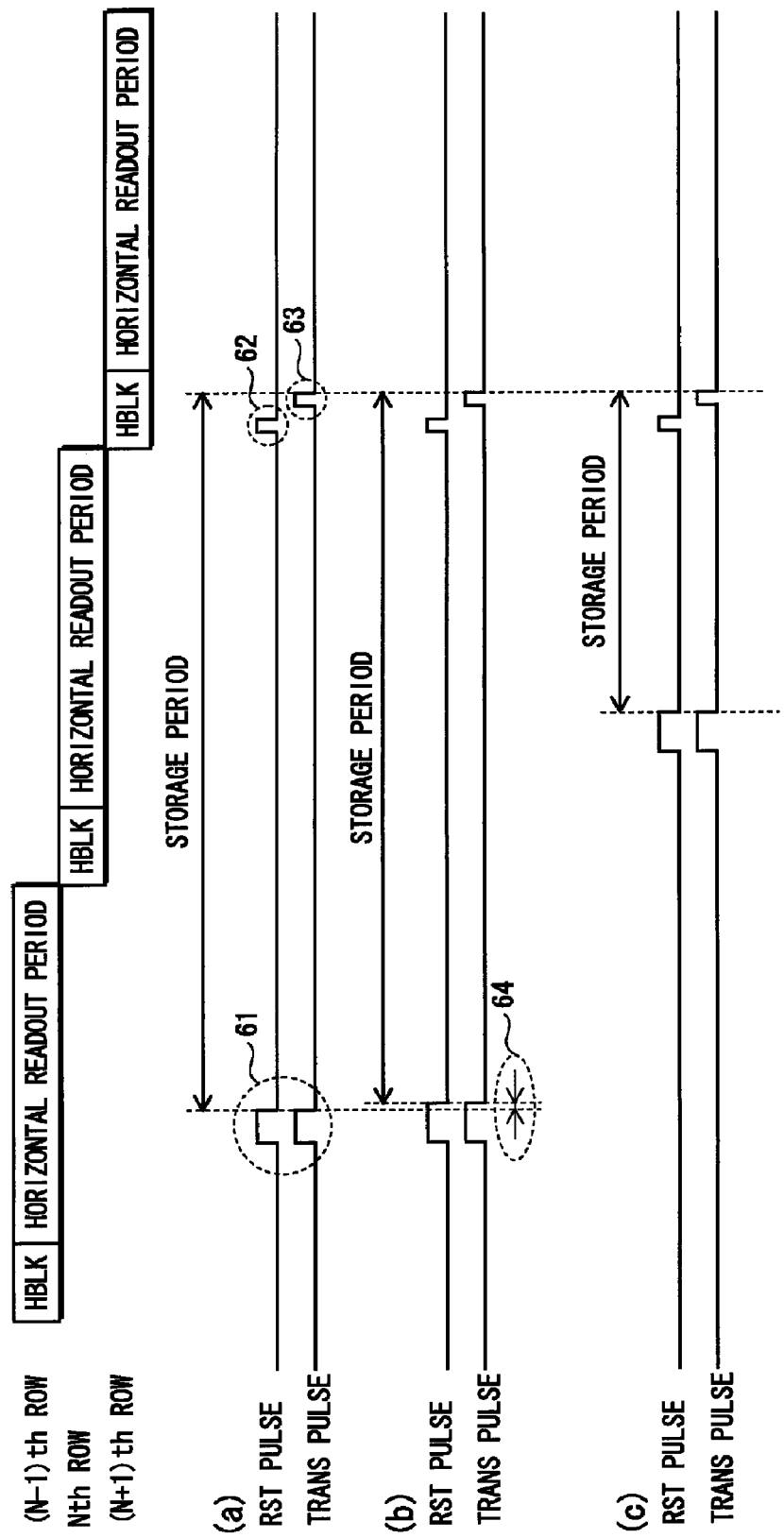
FIGS. 9A through 9c are each a diagram for explaining an advantage produced by the solid-state imaging device pertaining to the first embodiment of the present invention.

FIGS. 9A through 9C are each a diagram for explaining an advantage produced by the solid-state imaging device pertaining to the first embodiment of the present invention.

Illustrated here is a reset pulse (RST pulse) and a transfer pulse (TRANS pulse) that are applied to pixel signals in the (N+1)th row. When both the reset pulse level and the transfer pulse level are set to high simultaneously, transistors Tr1 and Tr2 of each pixel go into an ON-state all together, and the potential of the photodiode PD can accordingly be reset to a power supply potential (see 61 in FIG. 9A). This enables an electronic shutter to function. On the other hand, when only the reset pulse level is set to high, only the transistor Tr2 goes into the ON-state, and the potential of the floating diffusion FD can accordingly be reset to a reference potential (see 62 in FIG. 9A). Likewise, when only the transfer pulse level is set to high, only the transistor Tr1 goes into the ON-state, and the potential of the floating diffusion FD can accordingly be set to a signal potential corresponding to the charge generated by the photodiode PD (see 63 in FIG. 9A). A time period between the electronic shutter and the transfer is a storage period (exposure time).

In the first embodiment, image noise in a captured image can be suppressed even when the electronic shutter pulse is applied during the horizontal readout period. Accordingly, the length of the exposure time for each pixel cycle can be finely adjusted (see 64 in FIG. 9B). It is also possible to realize an ultra-high-speed shutter wherein the length of the exposure time is shorter than the length of a horizontal signal period (see FIG. 9C).

Second Embodiment

In the second embodiment, the readout of pixel signals in column order is suspended using a different method than the one described in the first embodiment. Other features are the same as those of the first embodiment, and the descriptions thereof are thus omitted.

Figure 10:
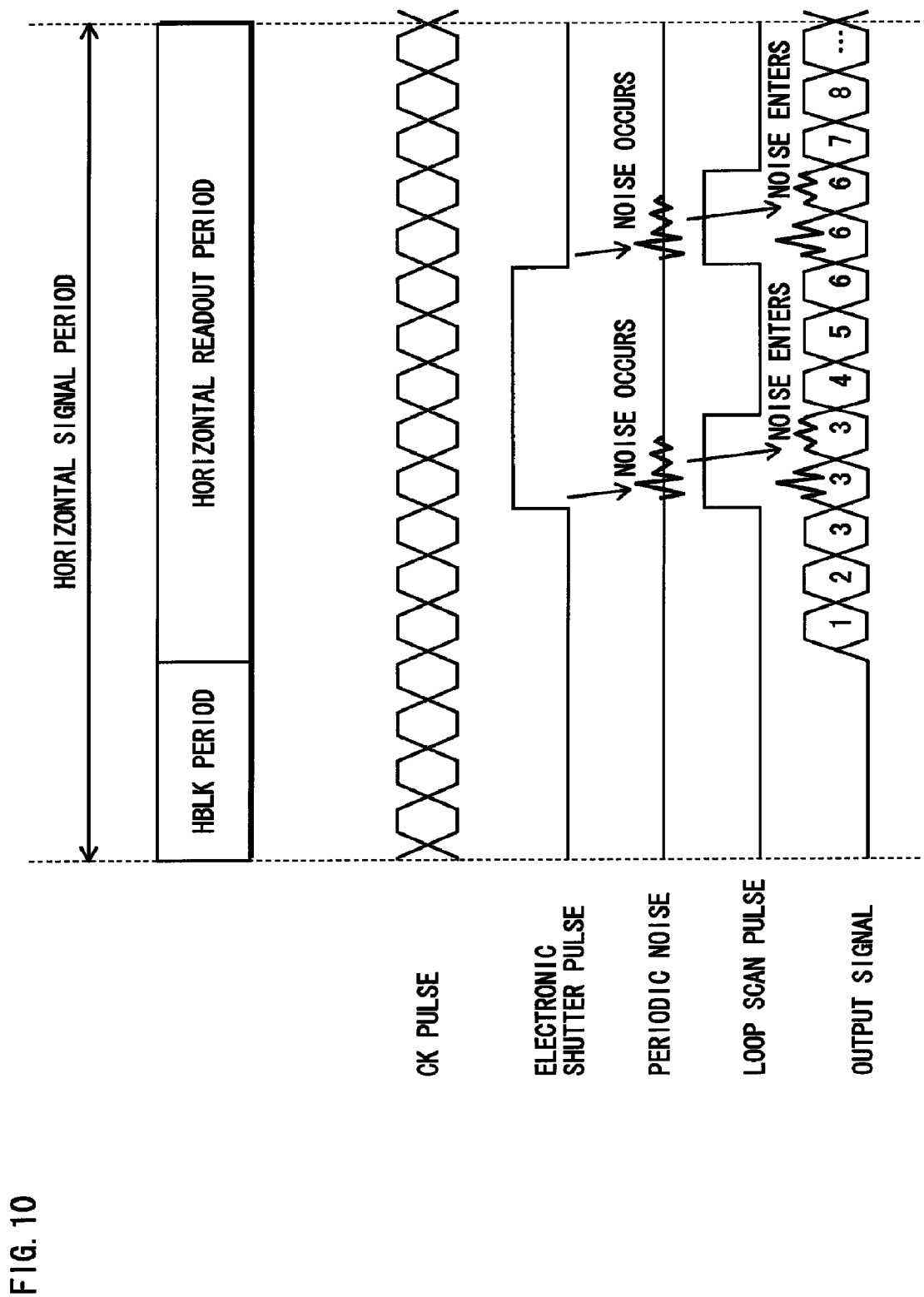
FIG. 10 shows a readout-standby operation pertaining to a second embodiment of the present invention, which is to suspend the readout of pixel signals in column order.

FIG. 10 shows a readout-standby operation pertaining to the second embodiment of the present invention, which is to suspend the readout of pixel signals in column order.

In the second embodiment, the column selection decoder 14 includes a shift register that can (i) shift in the forward direction, which corresponds to the column order of the pixel array, and (ii) pause the shift operation while receiving the clock pulse. The shift register shifts in the forward direction when the level of a loop scan pulse is low, and pauses the shift operation when the level of the loop scan pulse is high. The level of the loop scan pulse is designed to be (i) low during the horizontal readout period except during the readout-standby period, and (ii) high during the readout-standby period. With the loop scan pulse designed in the above-described manner, it is possible to read out a row of pixel signals in column order during the horizontal readout period except during the readout-standby period, and to suspend the readout of pixel signals in column order during the readout-standby period.

FIG. 10 exemplarily shows noise entering pixel signals from the fourth to fifth pixel cycles owing to the rise of the electronic shutter pulse, and from the ninth to tenth pixel cycles owing to the fall of the electronic shutter pulse. In the example of FIG. 10, the pixel signal in the third column is read out in the fourth and fifth pixel cycles. This way, the readout of pixel signals in the fourth column and onward is suspended during the readout-standby period, and is resumed when the readout-standby period has passed (i.e., in the sixth pixel cycle and onward). Likewise, the pixel signal in the sixth column is readout in the ninth and tenth pixel cycles. This way, the readout of pixel signals in the seventh column and onward is suspended during the readout-standby period, and is resumed when the readout-standby period has passed (i.e., in the eleventh pixel cycle and onward).

As set forth, the readout of pixel signals in column order is conducted during the horizontal readout period except during the readout-standby period, and is suspended during the readout-standby period. As such, provided that noise is expected to occur for a certain period and that the noise affects the quality of the pixel signals, it is possible to suppress image noise in a captured image by suspending the stated readout during that certain period.

Figure 11:
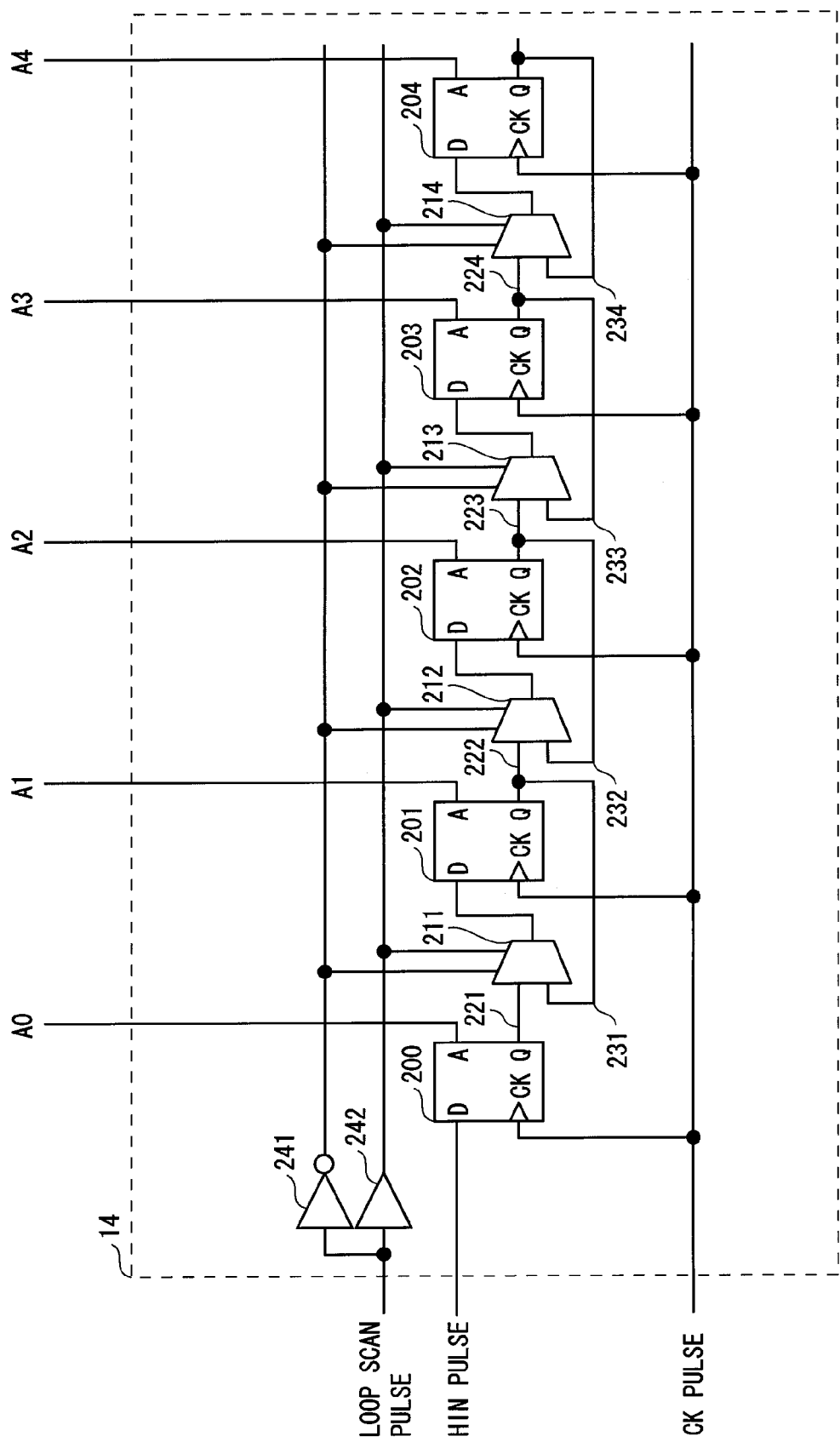
FIG. 11 shows a structure of the column selection decoder 14 pertaining to the second embodiment of the present invention.

FIG. 11 shows the structure of the column selection decoder 14 pertaining to the second embodiment of the present invention.

The column selection decoder 14 has multiple circuits of the same structure, with each circuit being assigned to a different one of the columns. For example, in observing the first column, an input terminal (D) of a flip-flop 201 is connected via a selector 211 to output terminals (Q) of flip-flops 200 and 201. Another output terminal (A) of the flip-flop 201 is connected via the selective signal line 20 to the signal processing unit 15. A clock pulse is inputted to a clock terminal (CK) of the flip-flop 201. The selector 211 selectively connects (i) the output terminal (Q) of the flip-flop 200 to the input terminal (D) of the flip-flop 201 when the loop scan pulse level is low, and (ii) the output terminal (Q) of the flip-flop 201 to the input terminal (D) of the flip-flop 201 when the loop scan pulse level is high. With each column having the same structure described above, the shift register can not only shift in the forward direction, but also pause the shift operation while receiving the clock pulse.

Figure 12:
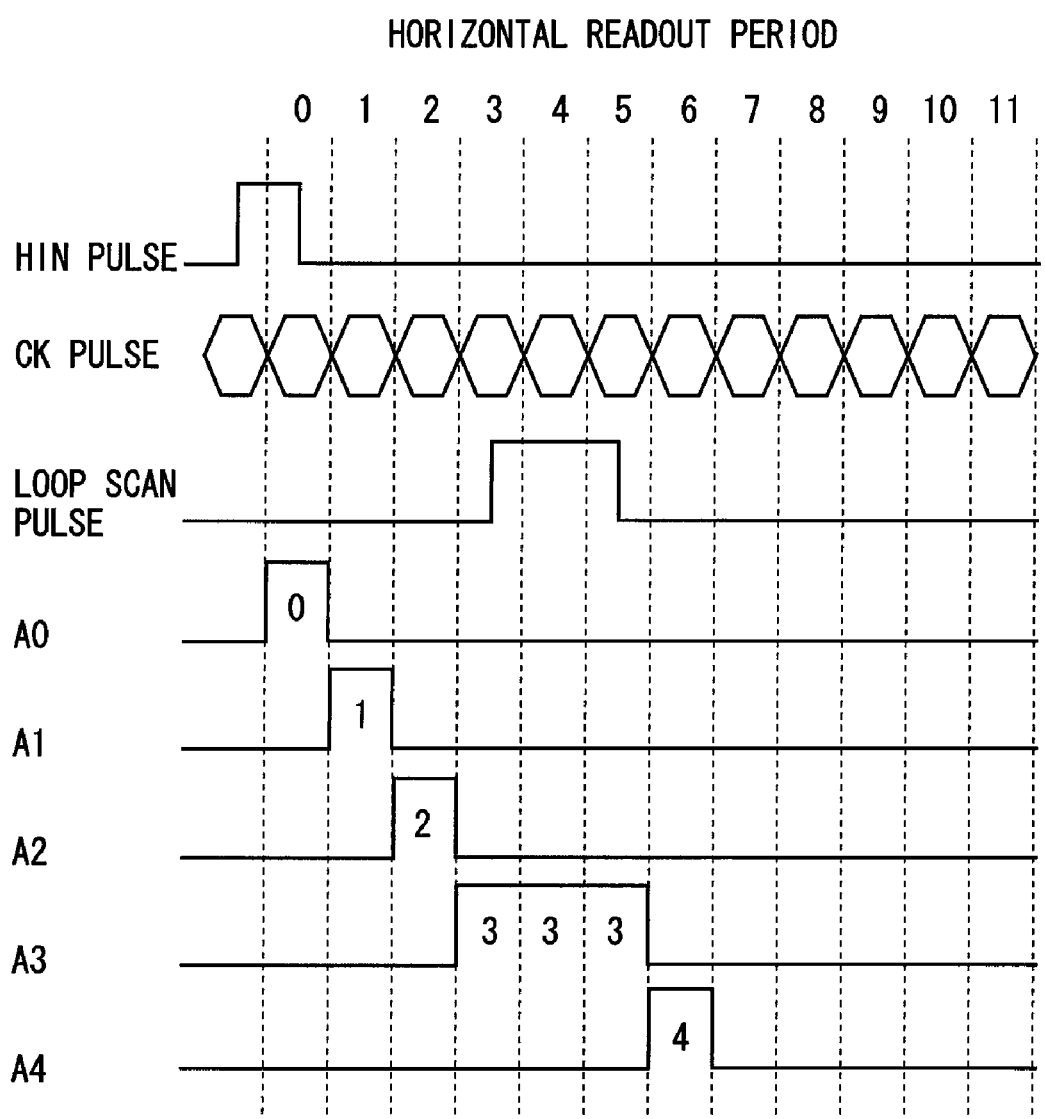
FIG. 12 shows an operation of the column selection decoder 14 pertaining to the second embodiment of the present invention.

FIG. 12 shows an operation of the column selection decoder 14 pertaining to the second embodiment of the present invention.

The column selection decoder 14 starts the shift operation upon data input (HIN pulse) that works as a trigger. As shown in FIG. 12, the column selection decoder 14 causes the shift register to shift in the forward direction when the loop scan pulse level is low, and to pause the shift operation when the loop scan pulse level is high.

The structure and operation shown in FIGS. 11 through 12 allow not only reading out the pixel signals in column order, but also suspending such a readout of the pixel signals in column order.

Third Embodiment

The third embodiment is different from the first embodiment in restricting the external output of pixel signals during the readout-standby period. Other features are the same as those of the first embodiment, and the descriptions thereof are thus omitted.

Figure 13:
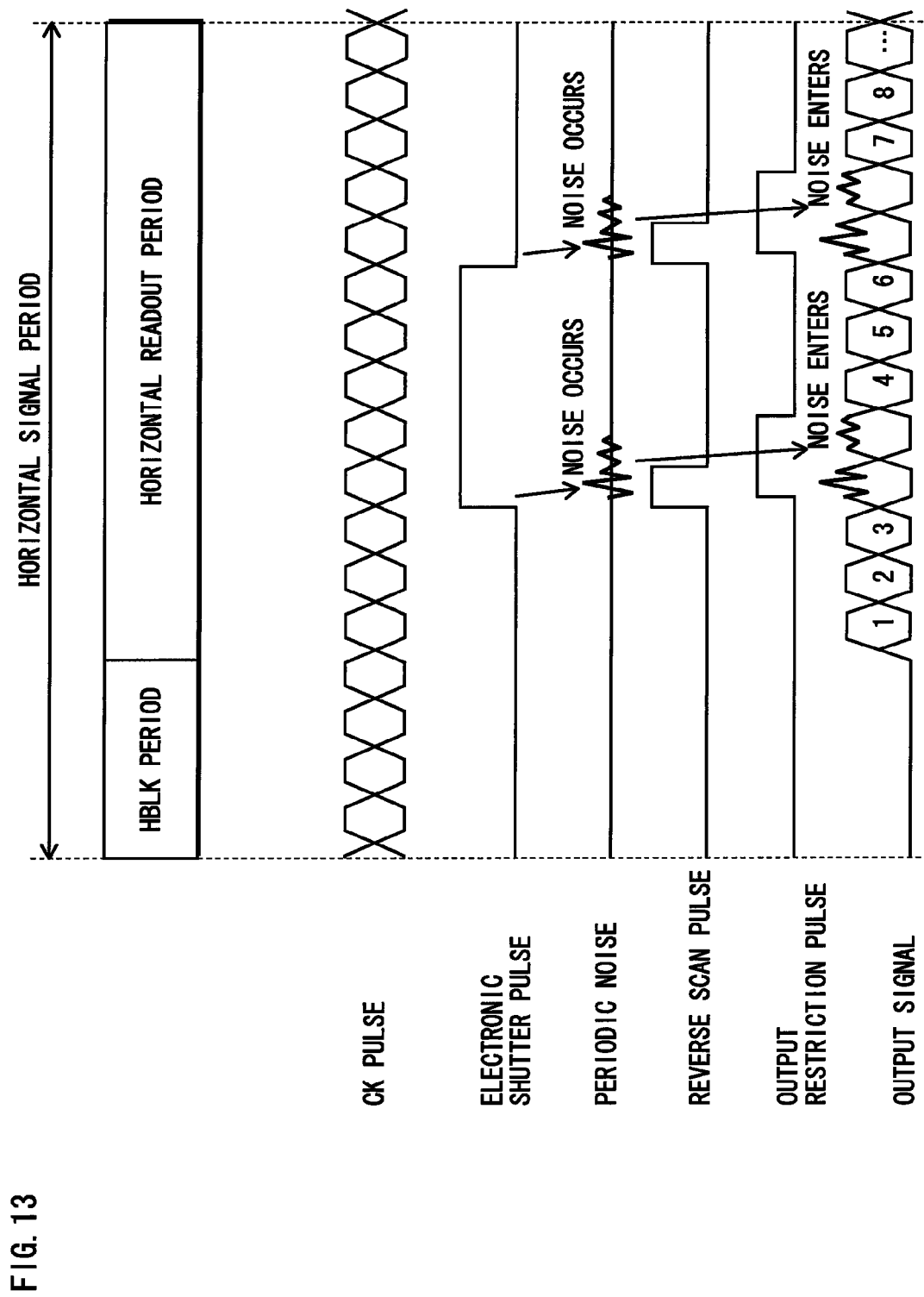
FIG. 13 shows a readout-standby operation pertaining to a third embodiment of the present invention, which is to suspend the readout of pixel signals in column order.

FIG. 13 shows a readout-standby operation pertaining to the third embodiment of the present invention, which is to suspend the readout of pixel signals in column order.

In the third embodiment, pixel signals are externally outputted when the level of an output restriction pulse is low, and are not externally outputted when the level of the output restriction pulse is high. The level of the output restriction pulse is designed to be low during the horizontal readout period except during the readout-standby period, and high during the readout-standby period. With the output restriction pulse designed in the above-described manner, it is possible to restrict the external output of unnecessary pixel signals during the readout-standby period, and hence to reduce the power consumption of a circuit for externally outputting pixel signals and of an image processing system.

Figure 14:
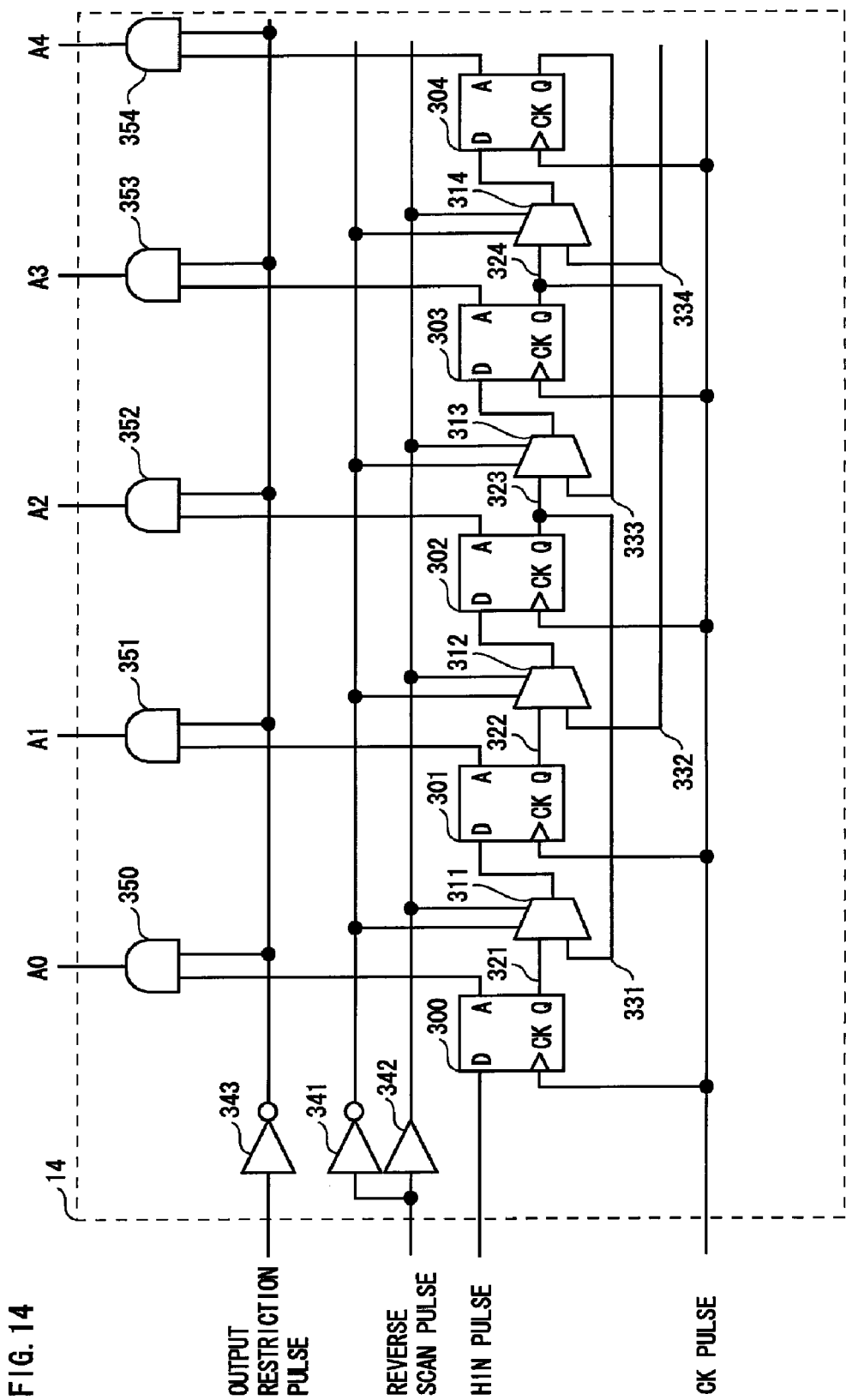
FIG. 14 shows a structure of the column selection decoder 14 pertaining to the third embodiment of the present invention.

FIG. 14 shows the structure of the column selection decoder 14 pertaining to the third embodiment of the present invention.

This structure is different from that of the first embodiment. For example, in observing the first column, an output terminal (A) of a flip-flop 301 is connected to the signal processing unit 15 via an AND circuit 351. Furthermore, a pair of an output signal from the output terminal (A) of the flip-flop 301 and an inversion signal of the output restriction pulse is inputted to the AND circuit 351. The output restriction pulse is applied by the timing control unit as one of the control signals.

A group of AND circuits (350, 351, 352, 353, 354, etc.) and the signal generation subunit, which generates the output restriction pulse to be applied by the timing control unit, function as a non-selective data input subunit that inputs non-selective data to the signal processing unit 15, the non-selective data selecting none of the columns constituting the pixel array 11.

Figure 15:
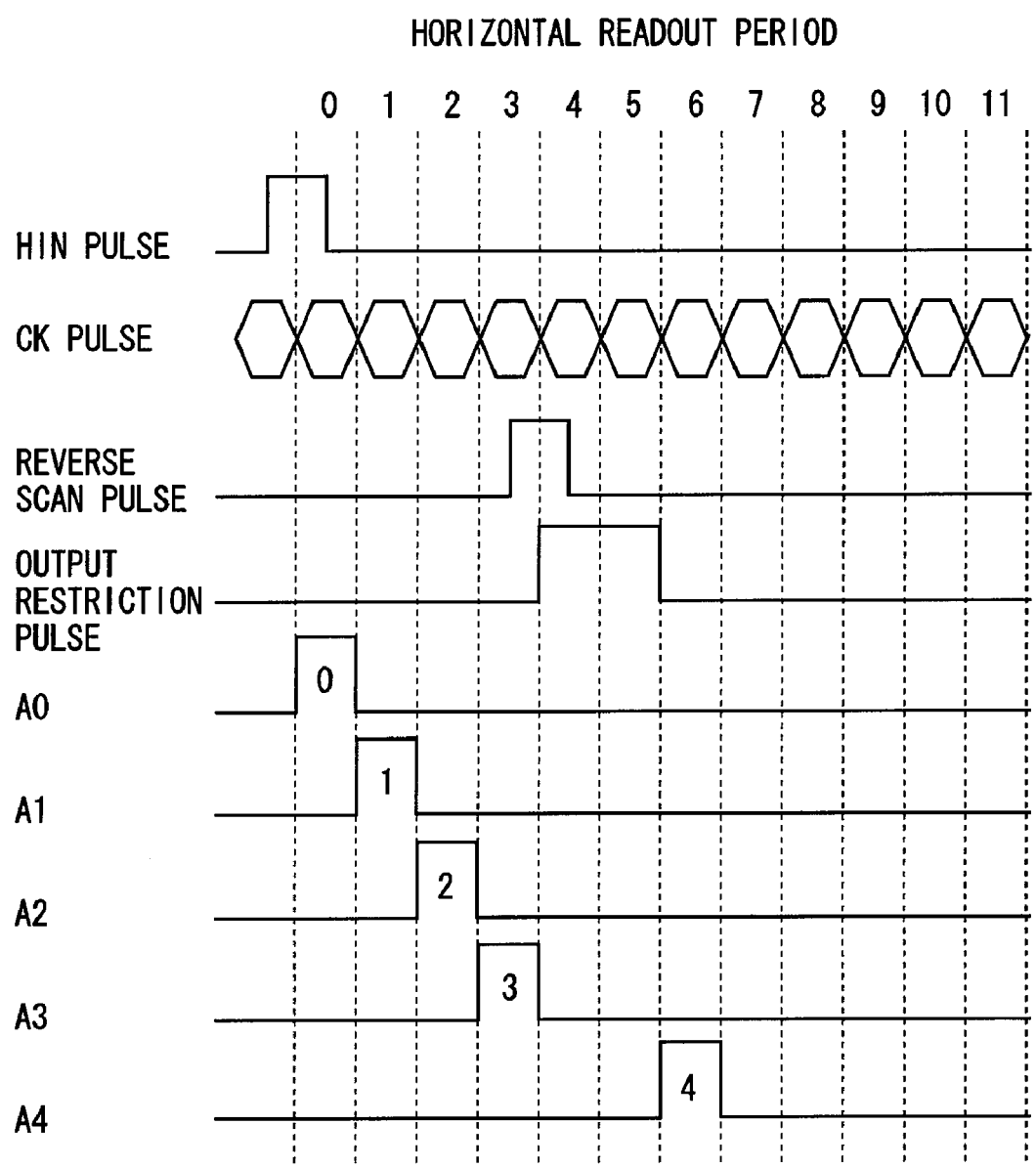
FIG. 15 shows an operation of the column selection decoder 14 pertaining to the third embodiment of the present invention.

FIG. 15 shows an operation of the column selection decoder 14 pertaining to the third embodiment of the present invention.

The column selection decoder 14 starts the shift operation upon data input (HIN pulse) that works as a trigger. As shown in FIG. 15, the column selection decoder 14 causes the shift register to shift in the forward direction when the reverse scan pulse level is low, and in the reverse direction when the reverse scan pulse level is high. Further, the column selection decoder 14 outputs the selective data that selects one of the columns constituting the pixel array 11 when the output restriction pulse level is low, and the non-selective data that selects none of the columns constituting the pixel array 11 when the output restriction pulse level is high. This way it is possible to restrict the external output of unnecessary pixel signals during the readout-standby period.

Fourth Embodiment

The fourth embodiment is different from the second embodiment in restricting the external output of pixel signals during the readout-standby period. Other features are the same as those of the second embodiment, and the descriptions thereof are thus omitted.

Figure 16:
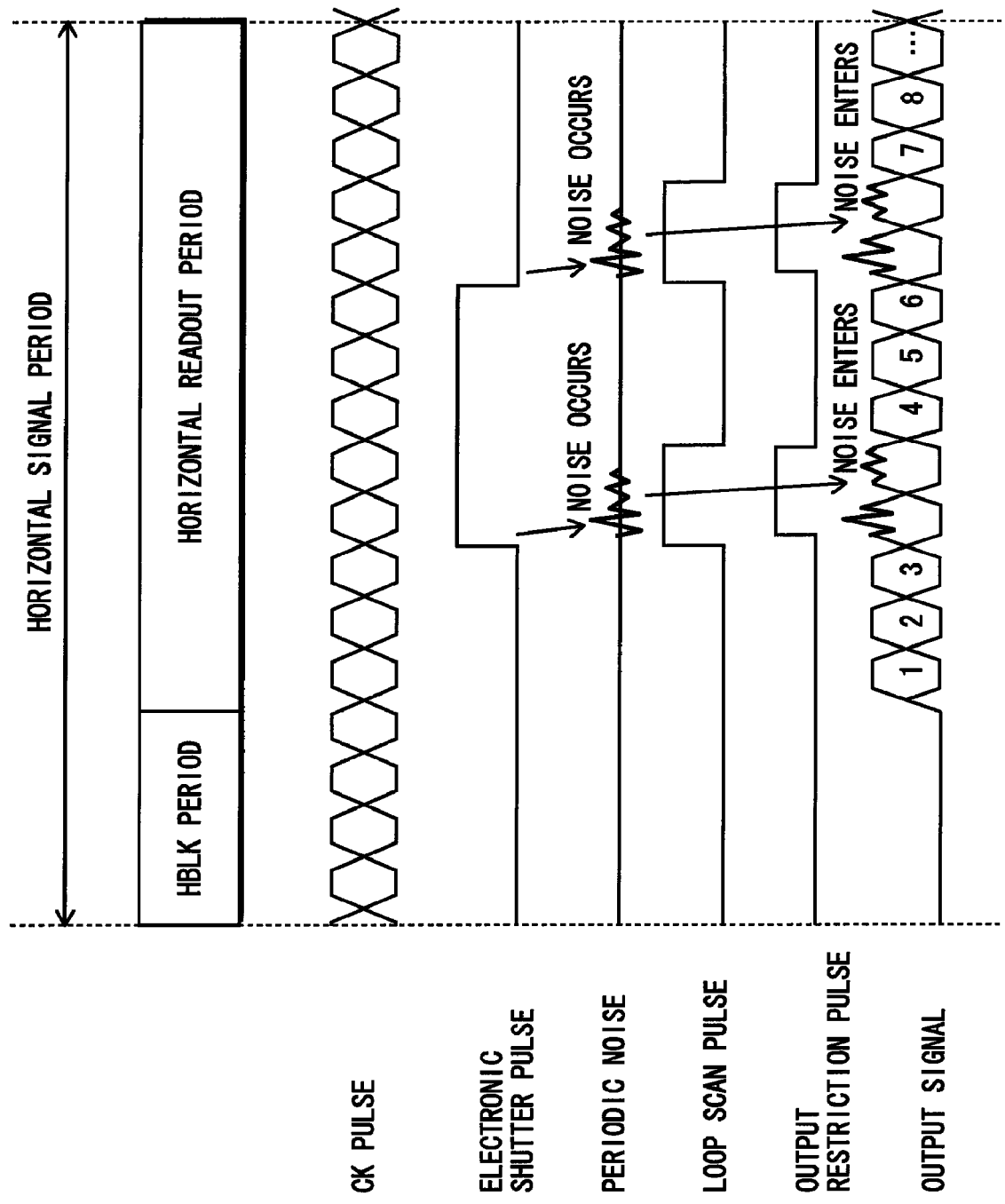
FIG. 16 shows a readout-standby operation pertaining to a fourth embodiment of the present invention, which is to suspend the readout of pixel signals in column order.

FIG. 16 shows a readout-standby operation pertaining to the fourth embodiment of the present invention, which is to suspend the readout of pixel signals in column order.

In the fourth embodiment, pixel signals are externally outputted when the output restriction pulse level is low, and are not externally outputted when the output restriction pulse level is high. The output restriction pulse level is designed to be low during the horizontal readout period except during the readout-standby period, and high during the readout-standby period. With the output restriction pulse designed in the above-described manner, it is possible to restrict the external output of unnecessary pixel signals during the readout-standby period, and hence to reduce the power consumption of a circuit for externally outputting pixel signals and of an image processing system.

Figure 17:
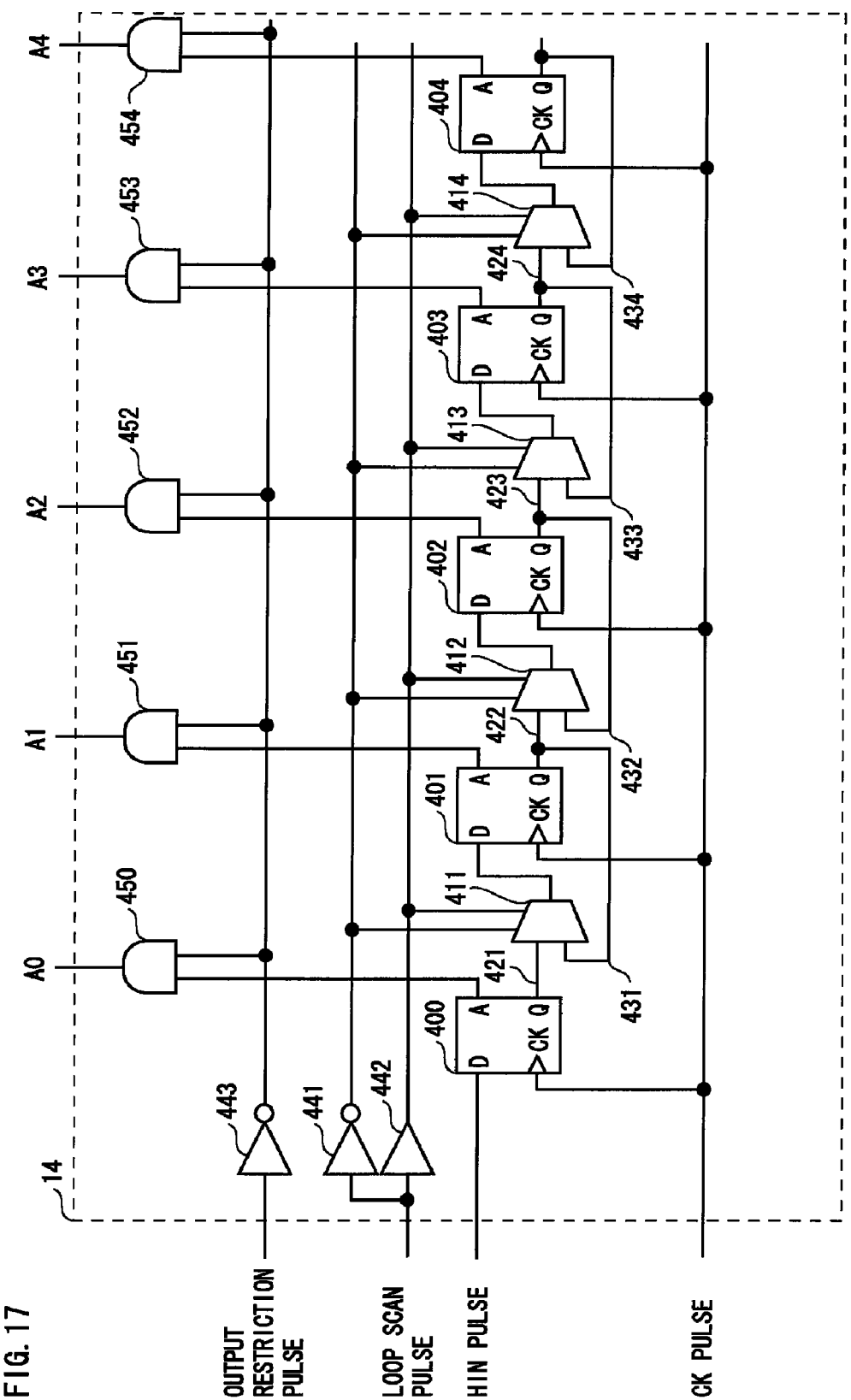
FIG. 17 shows a structure of the column selection decoder 14 pertaining to the fourth embodiment of the present invention.

FIG. 17 shows the structure of the column selection decoder 14 pertaining to the fourth embodiment of the present invention.

This structure is different from that of the second embodiment. For example, in observing the first column, an output terminal (A) of a flip-flop 401 is connected to the signal processing unit 15 via an AND circuit 451. A pair of an output signal from the output terminal (A) of the flip-flop 401 and the inversion signal of the output restriction pulse is inputted to the AND circuit 451. The output restriction pulse is applied by the timing control unit as one of the control signals.

A group of AND circuits (450, 451, 452, 453, 454, etc.) and the signal generation subunit, which generates the output restriction pulse to be applied by the timing control unit, function as a non-selective data input subunit that inputs non-selective data to the signal processing unit 15, the non-selective data selecting none of the columns constituting the pixel array 11.

Figure 18:
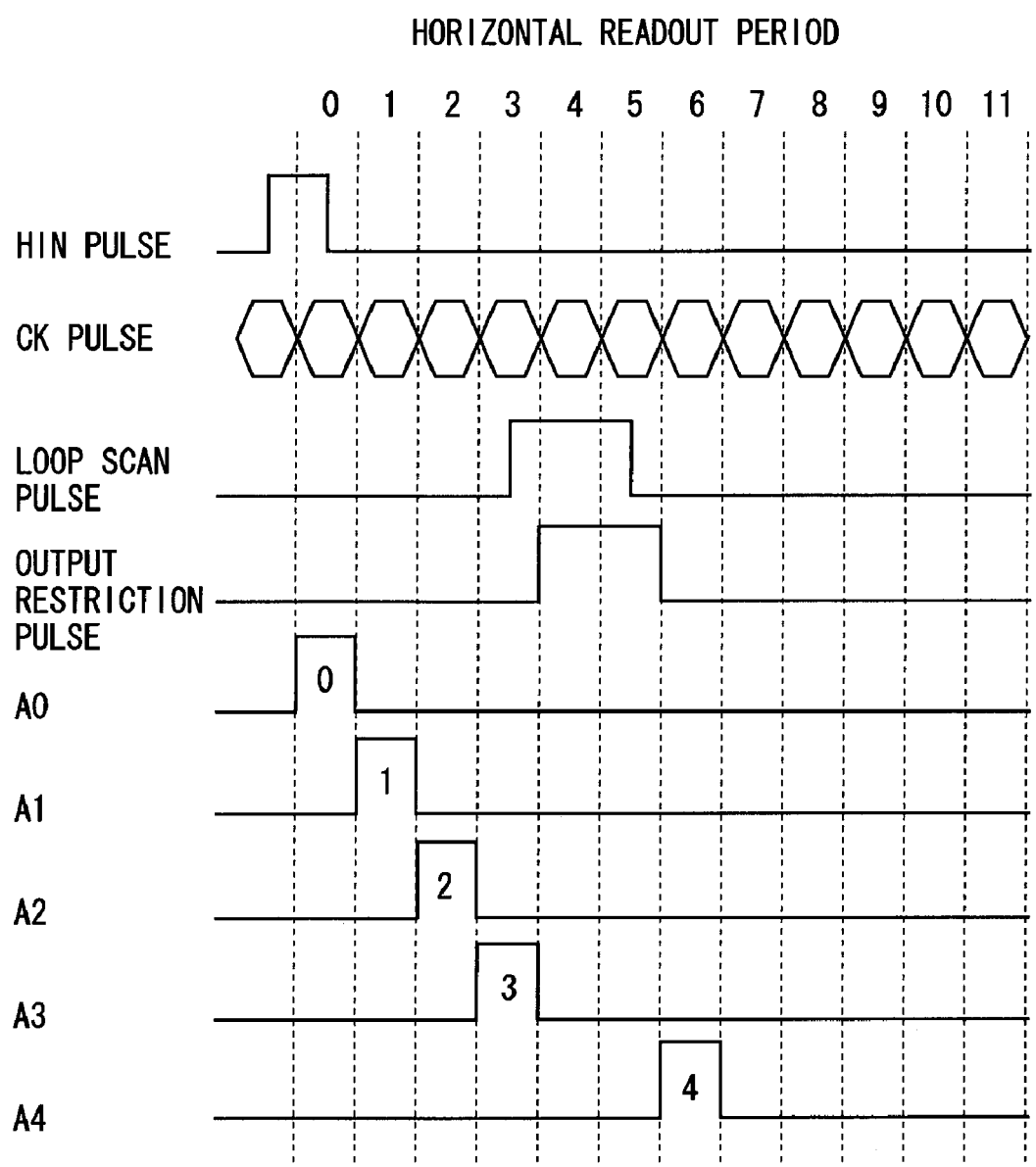
FIG. 18 shows an operation of the column selection decoder 14 pertaining to the fourth embodiment of the present invention.

FIG. 18 shows an operation of the column selection decoder 14 pertaining to the fourth embodiment of the present invention.

The column selection decoder 14 starts the shift operation upon data input (HIN pulse) that works as a trigger. As shown in FIG. 18, the column selection decoder 14 causes the shift register to shift in the forward direction when the loop scan pulse level is low, and to pause the shift operation when the loop scan pulse level is high. Further, the column selection decoder 14 outputs the selective data that selects one of the columns constituting the pixel array 11 when the output restriction pulse level is low, and the non-selective data that selects none of the columns constituting the pixel array 11 when the output restriction pulse level is high. This way it is possible to restrict the external output of unnecessary pixel signals during the readout-standby period.

Fifth Embodiment

In recent years, an MOS-type solid-state imaging device has applications in broader markets, and is expected to be used for an ultra-high-speed camera that can capture an image at a higher frame rate than a normal camcorder. In order to achieve a high frame rate, it is necessary to reduce the time required to read out pixel signals. In view of this, Japanese Laid-Open Patent Application No. 2006-93816 introduces technology for, during a horizontal readout period, reading out a row of pixel signals from the first row memory, while concurrently storing, into the second row memory, another row of pixel signals that are to be read out during the next horizontal readout period. With this technology, the readout of pixel signals in the (N+1)th row can be commenced immediately after the readout of pixel signals in the Nth row is completed. Accordingly, the time required to read out pixel signals can be reduced by an amount corresponding to the horizontal blanking period.

However, incorporating the above technology means reading out pixel signals in the Nth row while concurrently storing pixel signals in the (N+1)th row, both during the horizontal readout period. Consequently, there is a possibility that noise, which is caused by the operation to store the pixel signals in the (N+1)th row, may enter the pixel signals in the Nth row.

Figure 38:
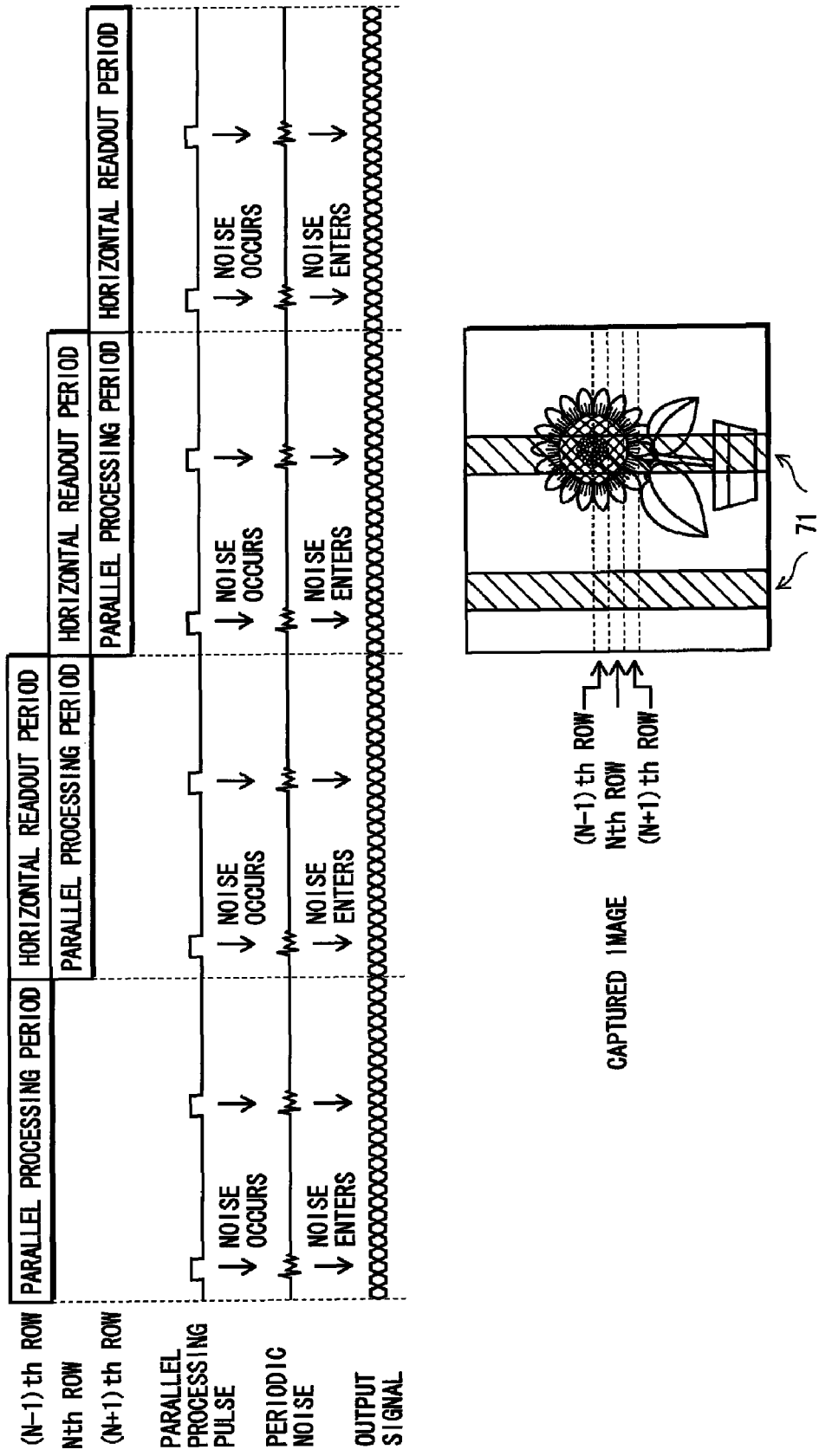
FIG. 38 is a diagram for explaining image noise and the cause of the image noise.

FIG. 38 is a diagram for explaining image noise and the cause of the image noise.

According to FIG. 38, for example, a horizontal readout period for the pixel signals in the Nth row coincides with a parallel processing period for the pixel signals in the (N+1)th row. In other words, the signal processing unit performs the following operations concurrently: (i) reading out the pixel signals in the Nth row, which are stored therein; and (ii) parallelly processing and then storing therein the pixel signals in the (N+1)th row. A parallel processing pulse is a control signal for driving the signal processing unit 15. As shown in FIG. 38, once the parallel processing pulse is applied, noise, which is caused by the parallel processing pulse, enters pixel signals by way of connected circuits. As the noise repeatedly occurs in every horizontal readout period, an image noise 71 appears notably as a vertical line or a vertical belt in a captured image.

The fifth embodiment through the eighth embodiment especially provide a solid-state imaging device that has the above-described specification, but is able to suppress image noise in a captured image.

Figure 19:
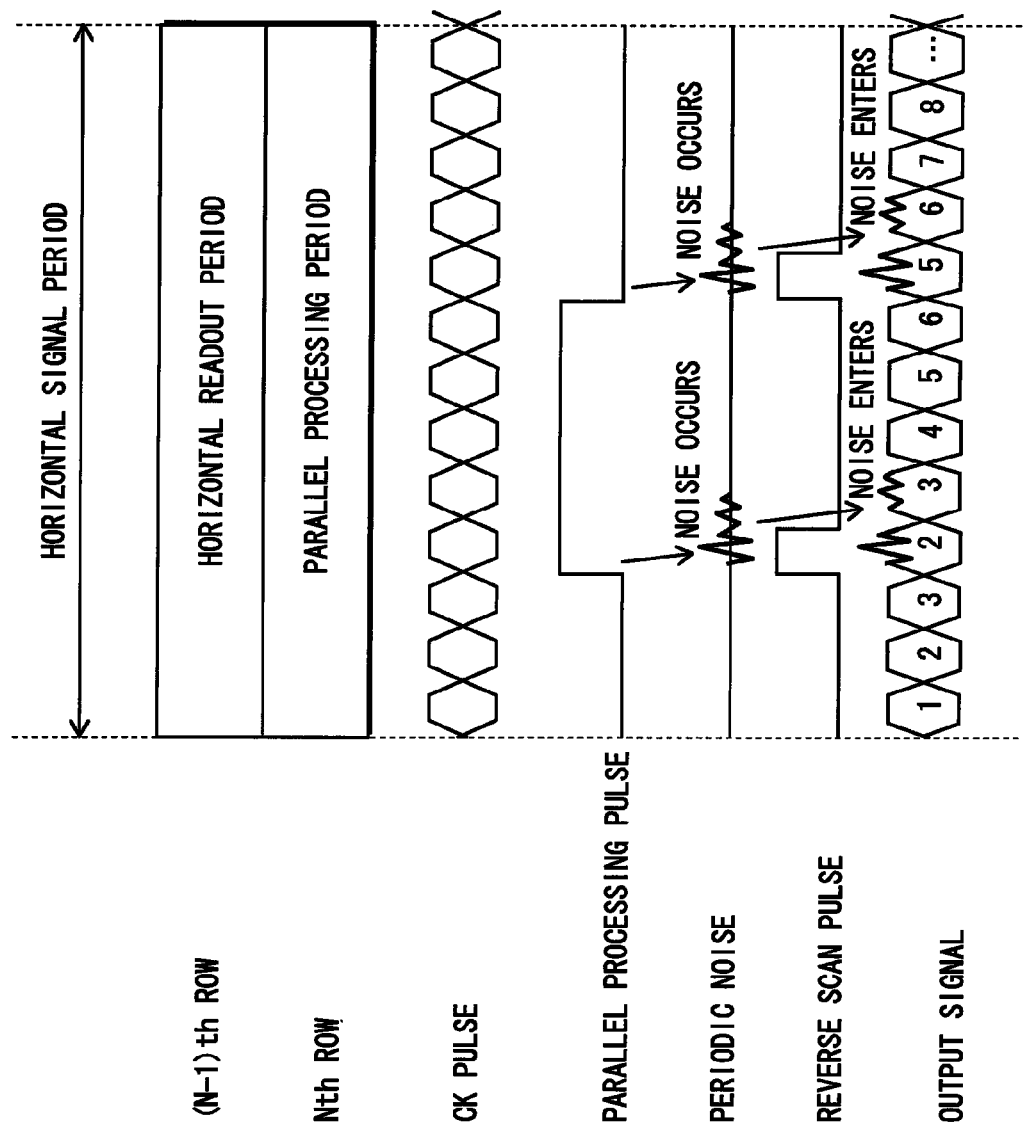
FIG. 19 shows a readout-standby operation pertaining to a fifth embodiment of the present invention, which is to suspend the readout of pixel signals in column order.

FIG. 19 shows a readout-standby operation pertaining to the fifth embodiment of the present invention, which is to suspend the readout of pixel signals in column order.

The fifth embodiment is different from the first embodiment in that periodic noise is caused by the parallel processing pulse. Other features are the same as those of the first embodiment. Specific examples of the parallel processing pulse include a sample-and-hold (SH) pulse and a clamp (CP) pulse, which are both applied to the signal processing unit 15.

Figure 20:
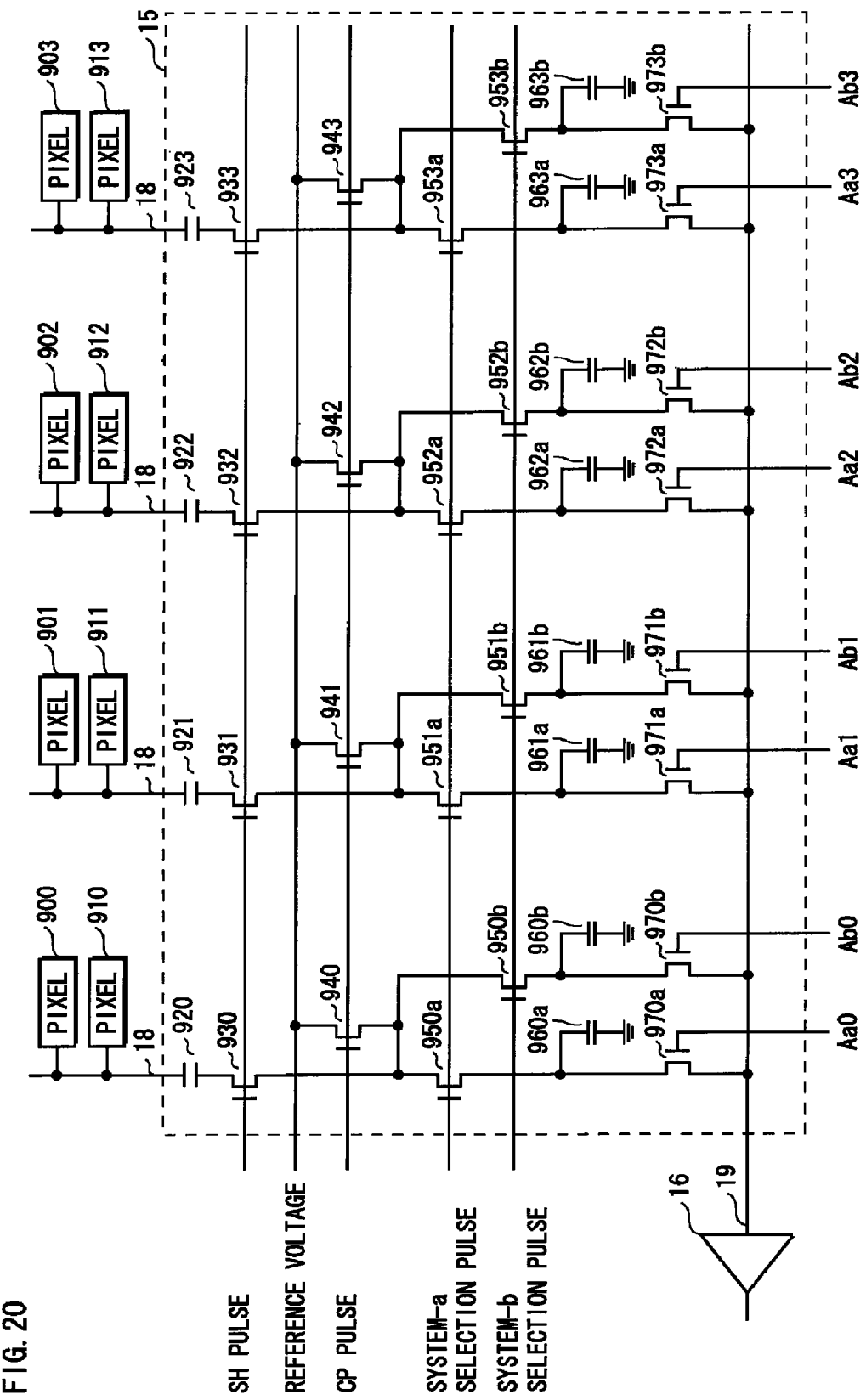
FIG. 20 shows a structure of the signal processing unit 15 pertaining to the fifth embodiment of the present invention.

FIG. 20 shows the structure of the signal processing unit 15 pertaining to the fifth embodiment of the present invention.

The signal processing unit 15 has multiple circuits of the same structure, with each circuit being assigned to a different one of the columns. For example, in observing the first column, the column-signal line 18 branches into two systems: a system-a and a system-b. A capacitor 921 and a transistor 931 are coupled to a part of the column-signal line 18 that has not been branched yet. On the other hand, transistors 951a and 971b are coupled to the system-a, and transistors 951b and 971b are coupled to the system-b. The column-signal line 18 has a node at which it branches into the system-a and the system-b, and this node is connected to the reference voltage supply via the transistor 941. Another node in the column-signal line 18, to which the transistors 951a and 971a are connected, is connected via a capacitor 961a to the ground. Yet another node in the column-signal line 18, to which the transistors 951b and 971b are connected, is connected via a capacitor 961b to the ground.

A first group of capacitors (960a, 961a, 962a, 963a, etc.) functions as the first row memory for storing a row of pixel signals. Likewise, a second group of capacitors (960b, 961b, 962b, 963b, etc.) functions as the second row memory for storing another row of pixel signals. A group of transistors (970a, 970b, 971a, 971b, 972a, 972b, 973a, 973b, etc.), the horizontal signal line 19, and the output amplifier 16 function as an output subunit that externally outputs one of the row of pixel signals stored in each row memory.

Figure 21:
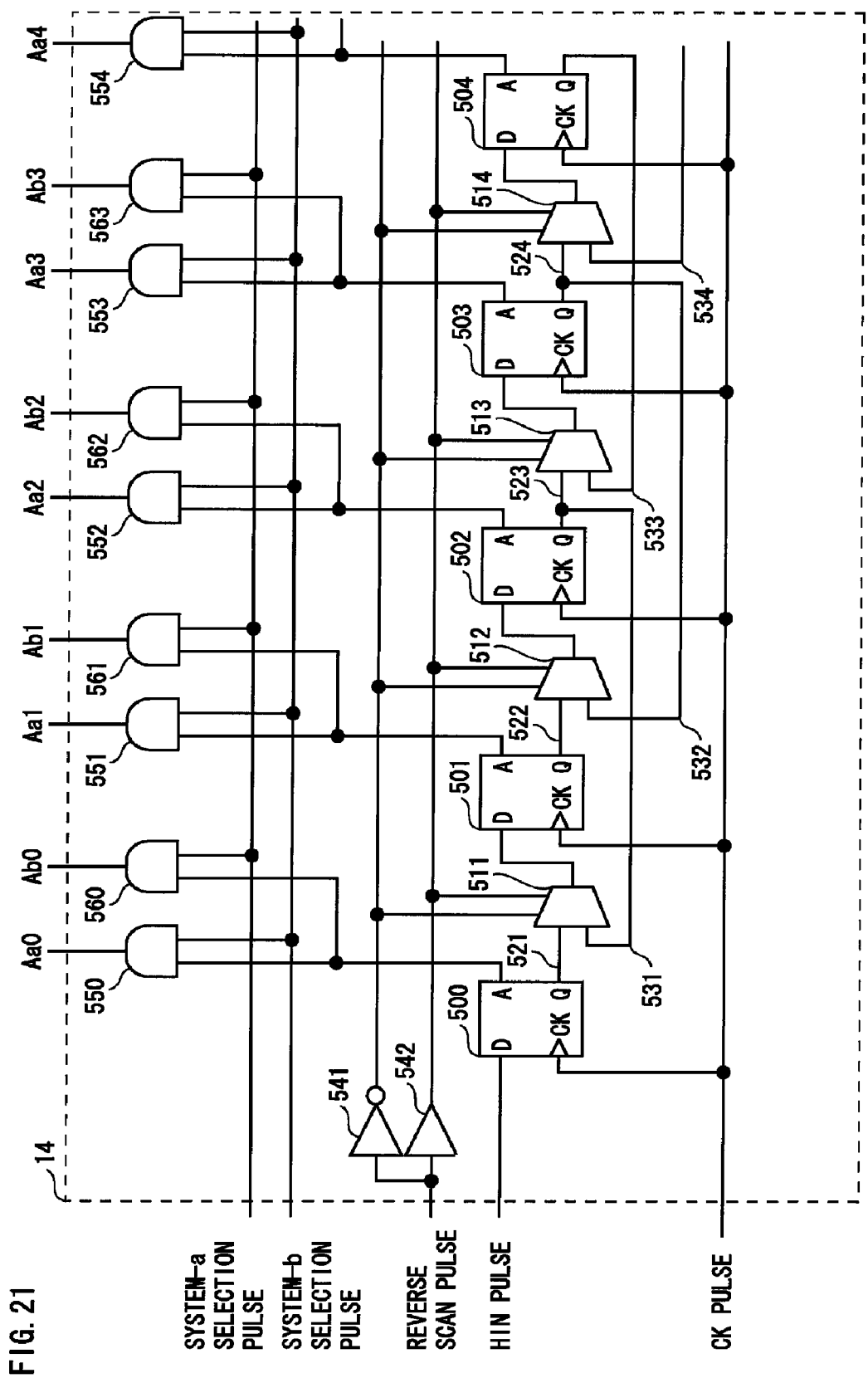
FIG. 21 shows a structure of the column selection decoder 14 pertaining to the fifth embodiment of the present invention.

FIG. 21 shows the structure of the column selection decoder 14 pertaining to the fifth embodiment of the present invention.

This structure is different from that of the first embodiment. For example, in observing the first column, an output terminal (A) of a flip-flop 501 is connected to the signal processing unit 15 via AND circuits 551 and 561. A pair of an output signal from the output terminal (A) of the flip-flop 501 and a system-b selection pulse is inputted to the AND circuit 551. An output signal of the AND circuit 551 is inputted to the gate of the transistor 971a provided in the signal processing unit 15. On the other hand, a pair of the output signal from the output terminal (A) of the flip-flop 501 and a system-a selection pulse is inputted to the AND circuit 561. An output signal of the AND circuit 561 is inputted to the gate of the transistor 971b provided in the signal processing unit 15. Each of the system-a selection pulse and the system-b selection pulse is applied by the timing control unit as one of the control signals.

The structures shown in FIGS. 20 and 21 indicate that, by designing the levels of the system-a selection pulse and the system-b selection pulse such that one becomes high when the other is low, it is possible to read out pixel signals from the first row memory while concurrently storing different pixel signals into the second row memory, or vice versa (read out pixel signals from the second row memory while concurrently storing different pixel signals into the first row memory).

Figure 22:
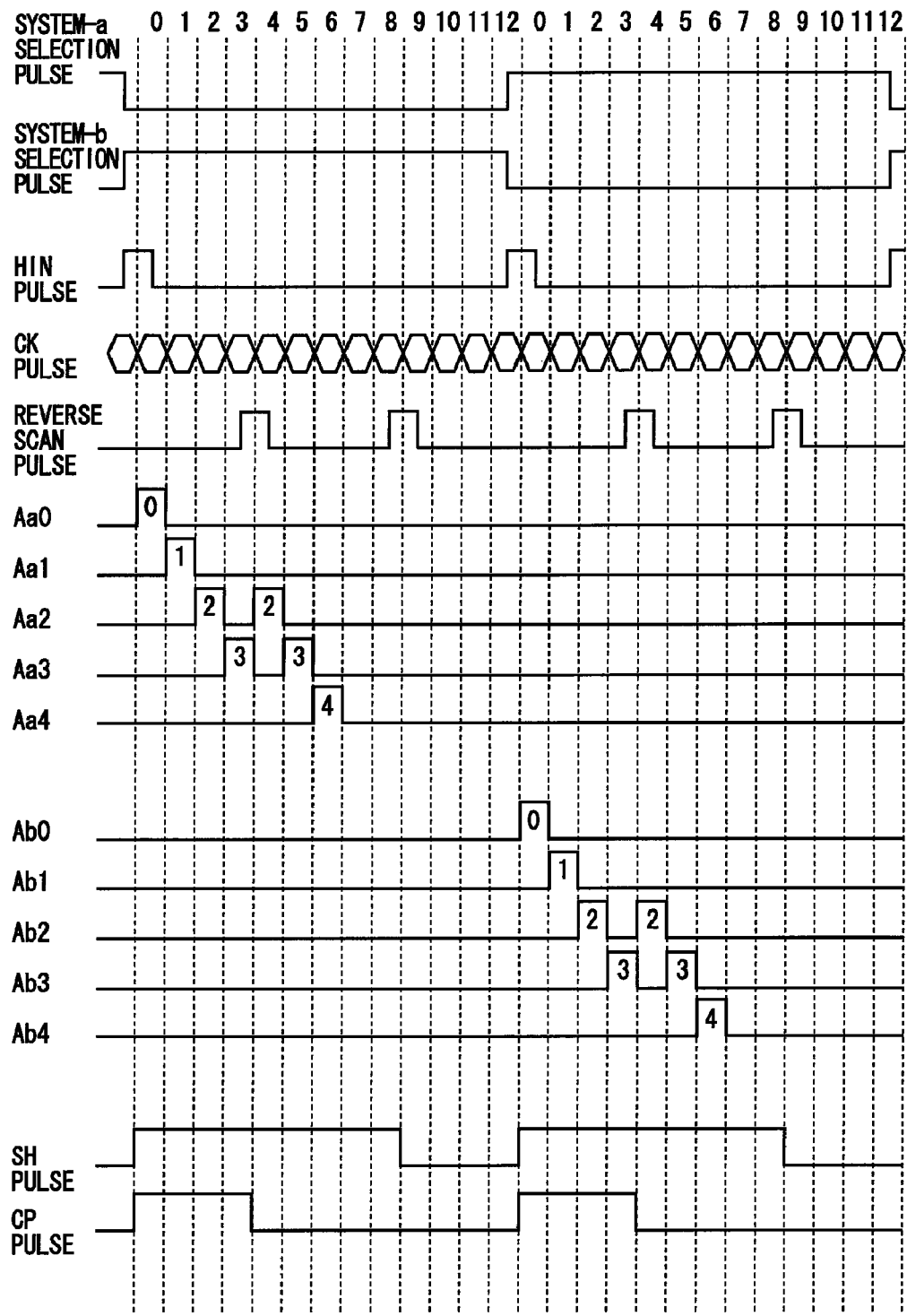
FIG. 22 shows an operation of the column selection decoder 14 pertaining to the fifth embodiment of the present invention.

FIG. 22 shows an operation of the column selection decoder 14 pertaining to the fifth embodiment of the present invention.

The column selection decoder 14 starts the shift operation upon data input (HIN pulse) that works as a trigger. When the level of the system-a selection pulse is low and the level of the system-b selection pulse is high, pixel signals are read out from the first row memory, and at the same time, different pixel signals are stored into the second row memory. On the other hand, when the level of the system-a selection pulse is high and the level of the system-b selection pulse is low, pixel signals are stored into the first row memory, and at the same time, different pixel signals are read out from the second row memory.

Described here is an exemplary case where noise is caused by the fall of the SH pulse and the fall of the CP pulse. Therefore, the reverse scan pulse level is designed to become high upon the falls of the SH pulse and the CP pulse. Provided that noise is expected to occur for a certain period, caused by the operation to store pixel signals, the reverse scan pulse designed in the above-described manner allows suspending the readout of pixel signals in column order during that certain period.

Sixth Embodiment

Figure 23:
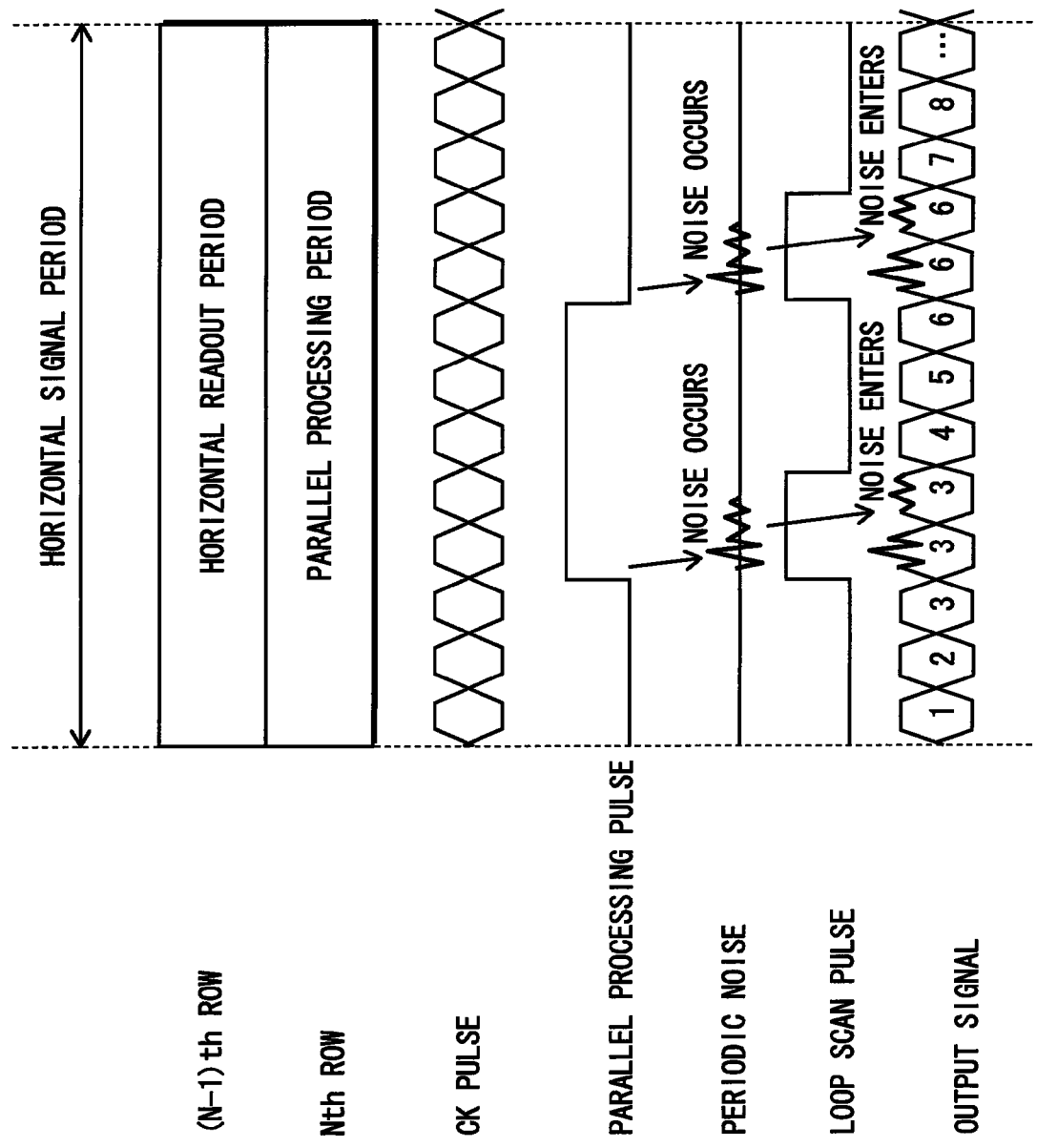
FIG. 23 shows a readout-standby operation pertaining to a sixth embodiment of the present invention, which is to suspend the readout of pixel signals in column order.

FIG. 23 shows a readout-standby operation pertaining to the sixth embodiment of the present invention, which is to suspend the readout of pixel signals in column order.

The sixth embodiment introduces a specification for a function that allows, during the horizontal readout period, reading out pixel signals in the Nth row while concurrently storing pixel signals in the (N+1)th row. In that sense, the sixth embodiment is similar to the fifth embodiment. It is accordingly assumed that this specification accompanies the parallel processing pulse, which can cause periodic noise. In the sixth embodiment, the readout of pixel signals in column order is suspended by using the method described in the second embodiment.

Figure 24:
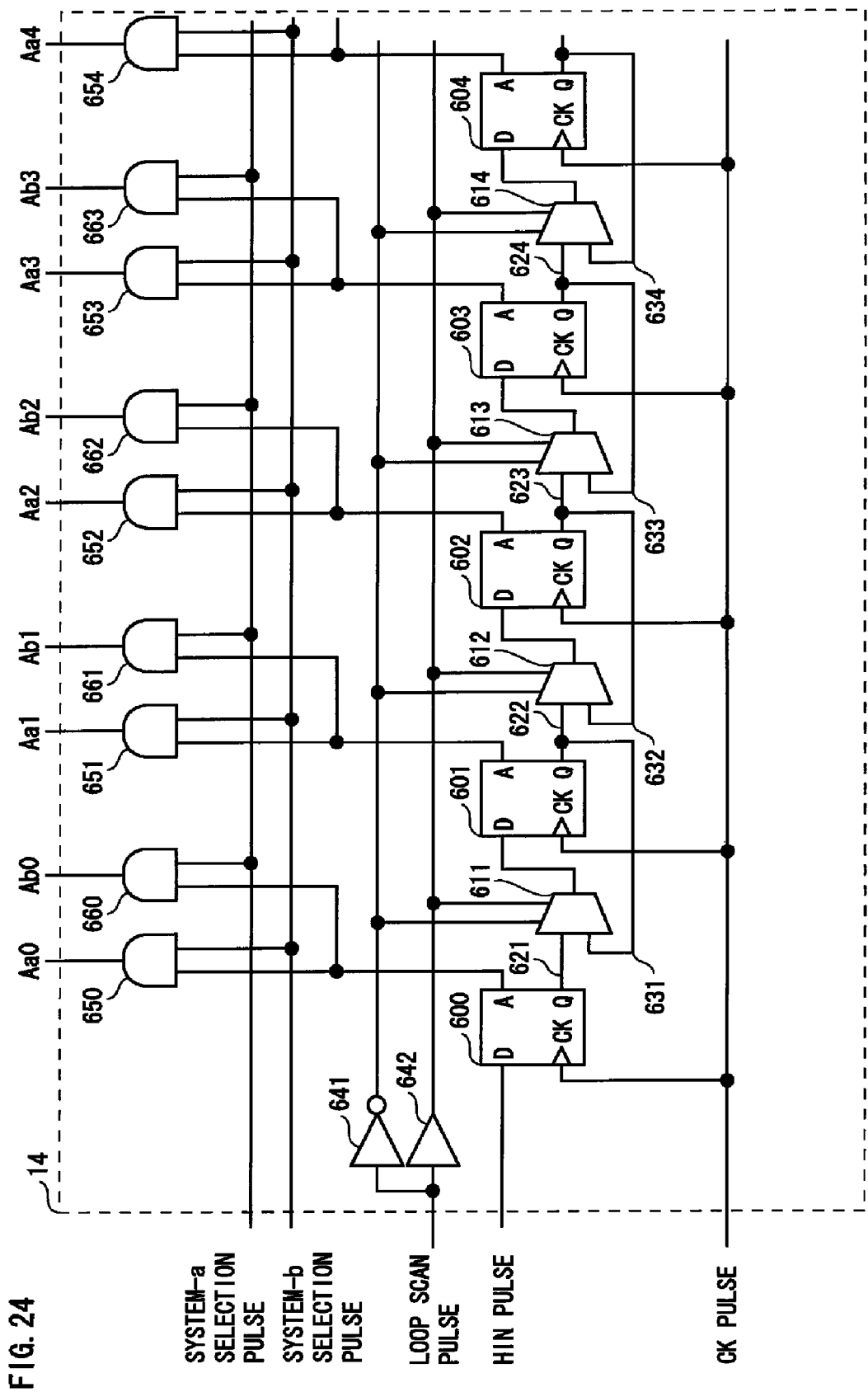
FIG. 24 shows a structure of the column selection decoder 14 pertaining to the sixth embodiment of the present invention.

FIG. 24 shows the structure of the column selection decoder 14 pertaining to the sixth embodiment of the present invention.

This structure is different from that of the second embodiment. For example, in observing the first column, an output terminal (A) of a flip-flop 601 is connected to the signal processing unit 15 via AND circuits 651 and 661. A pair of an output signal from the output terminal (A) of the flip-flop 601 and the system-b selection pulse is inputted to the AND circuit 651. An output signal of the AND circuit 651 is inputted to the gate of a transistor 971a provided in the signal processing unit 15. On the other hand, a pair of the output signal from the output terminal (A) of the flip-flop 601 and the system-a selection pulse is inputted to the AND circuit 661. An output signal of the AND circuit 661 is inputted to the gate of a transistor 971b provided in the signal processing unit 15.

Figure 25:
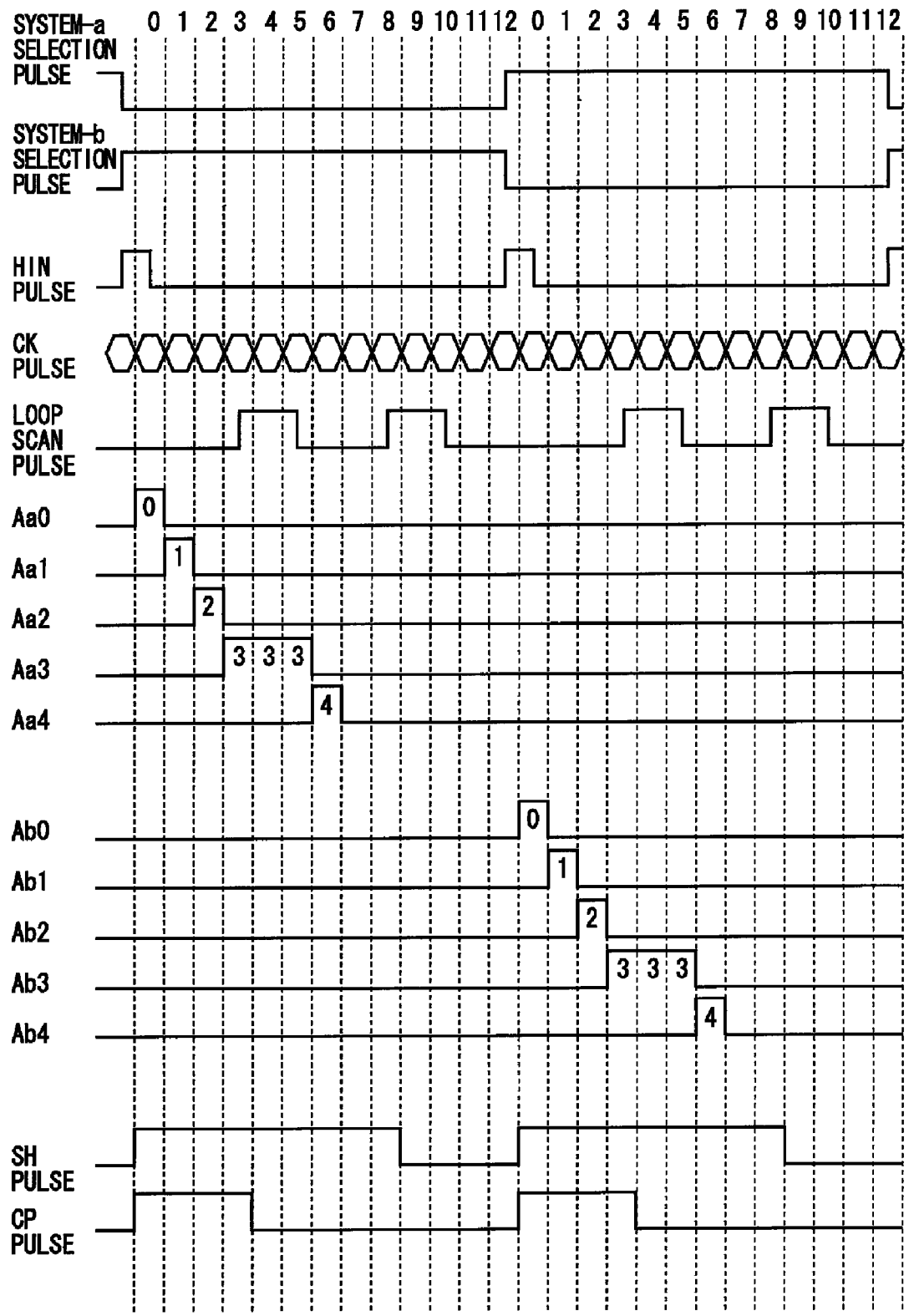
FIG. 25 shows an operation of the column selection decoder 14 pertaining to the sixth embodiment of the present invention.

FIG. 25 shows an operation of the column selection decoder 14 pertaining to the sixth embodiment of the present invention.

The column selection decoder 14 starts the shift operation upon data input (HIN pulse) that works as a trigger. When the level of the system-a selection pulse is low and the level of the system-b selection pulse is high, pixel signals are read out from the first row memory, and at the same time, different pixel signals are stored into the second row memory. On the other hand, when the level of the system-a selection pulse is high and the level of the system-b selection pulse is low, pixel signals are stored into the first row memory, and at the same time, different pixel signals are read out from the second row memory.

Described here is an exemplary case where noise is caused by the fall of the SH pulse and the fall of the CP pulse. Therefore, the loop scan pulse level is designed to become high upon the falls of the SH pulse and the CP pulse. Provided that noise is expected to occur for a certain period, the loop scan pulse designed in the above-described manner allows suspending the readout of pixel signals in column order during that certain period.

Seventh Embodiment

The seventh embodiment is different from the fifth embodiment in restricting the external output of pixel signals during the readout-standby period. Other features are the same as those of the fifth embodiment, and the descriptions thereof are thus omitted.

Figure 26:
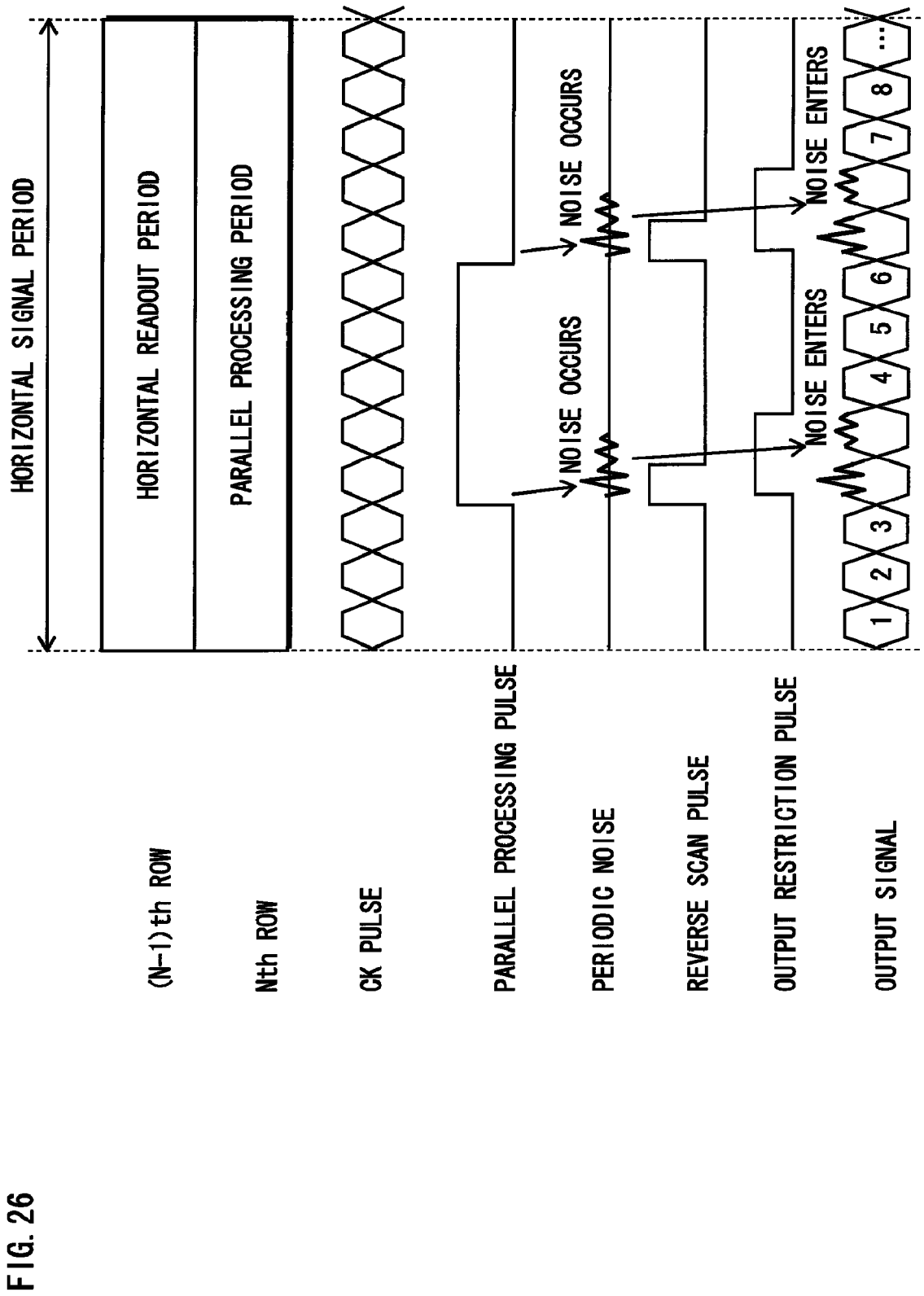
FIG. 26 shows a readout-standby operation pertaining to a seventh embodiment of the present invention, which is to suspend the readout of pixel signals in column order.

FIG. 26 shows a readout-standby operation pertaining to the seventh embodiment, which is to suspend the readout of pixel signals in column order.

In the seventh embodiment, pixel signals are externally outputted when the output restriction pulse level is low, and are not externally outputted when the output restriction pulse level is high. The output restriction pulse level is designed to be low during the horizontal readout period except during the readout-standby period, and high during the readout-standby period. With the output restriction pulse designed in the above-described manner, it is possible to restrict the external output of unnecessary pixel signals during the readout-standby period, and hence to reduce the power consumption of a circuit for externally outputting pixel signals and of an image processing system.

Figure 27:
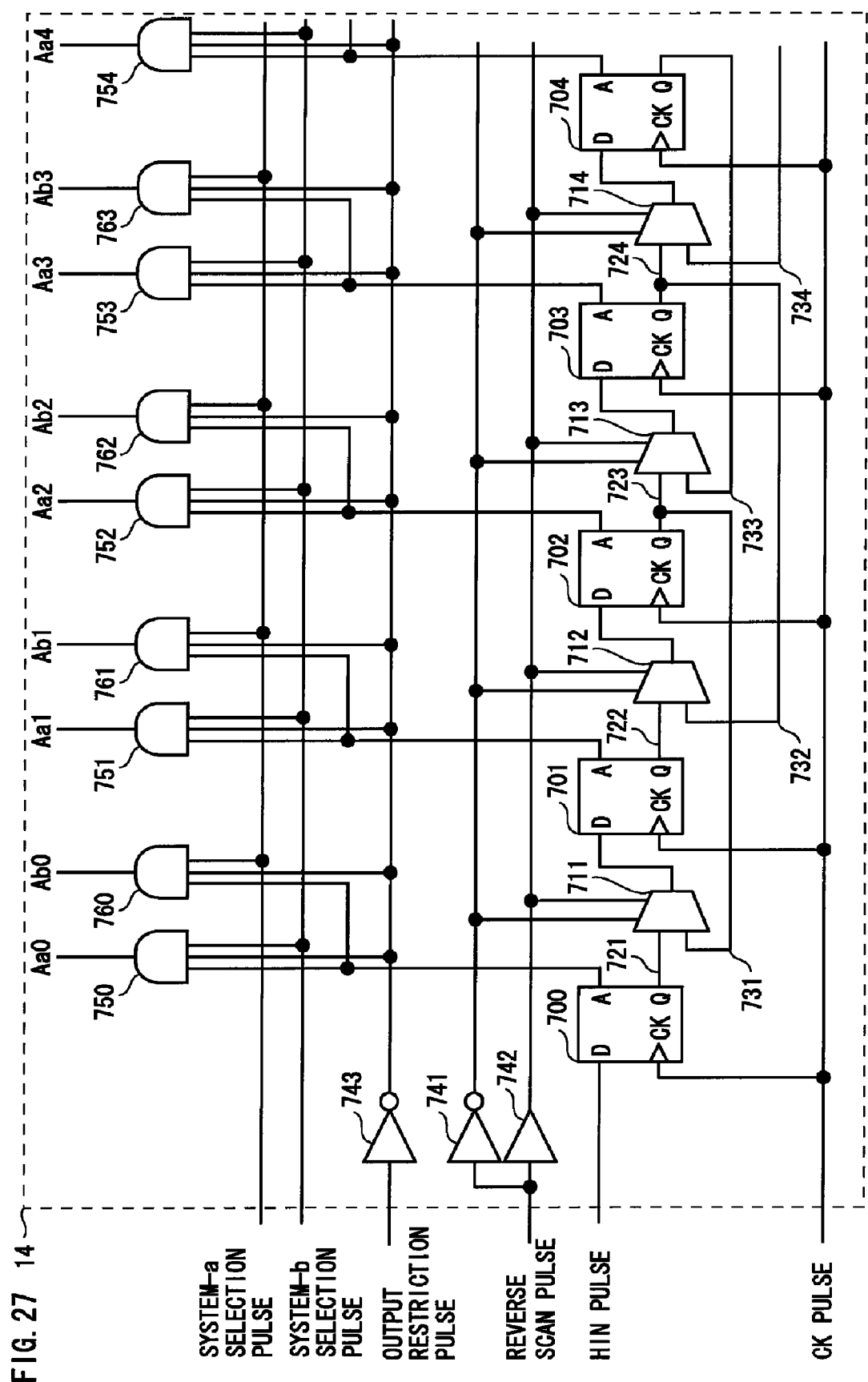
FIG. 27 shows a structure of the column selection decoder 14 pertaining to the seventh embodiment of the present invention.

FIG. 27 shows the structure of the column selection decoder 14 pertaining to the seventh embodiment of the present invention.

This structure is different from that of the fifth embodiment. For example, in observing the first column, the inversion signal of the output restriction pulse is inputted to AND circuits 751 and 761. Note that the output restriction pulse here is the same as the one described in the third embodiment.

A group of AND circuits (750, 751, 752, 753, 754, 760, 761, 762, 763, 764, etc.) and the signal generation subunit, which generates the output restriction pulse to be applied by the timing control unit, function as a non-selective data input subunit that inputs non-selective data to the signal processing unit 15, the non-selective data selecting none of the columns constituting the pixel array 11.

Figure 28:
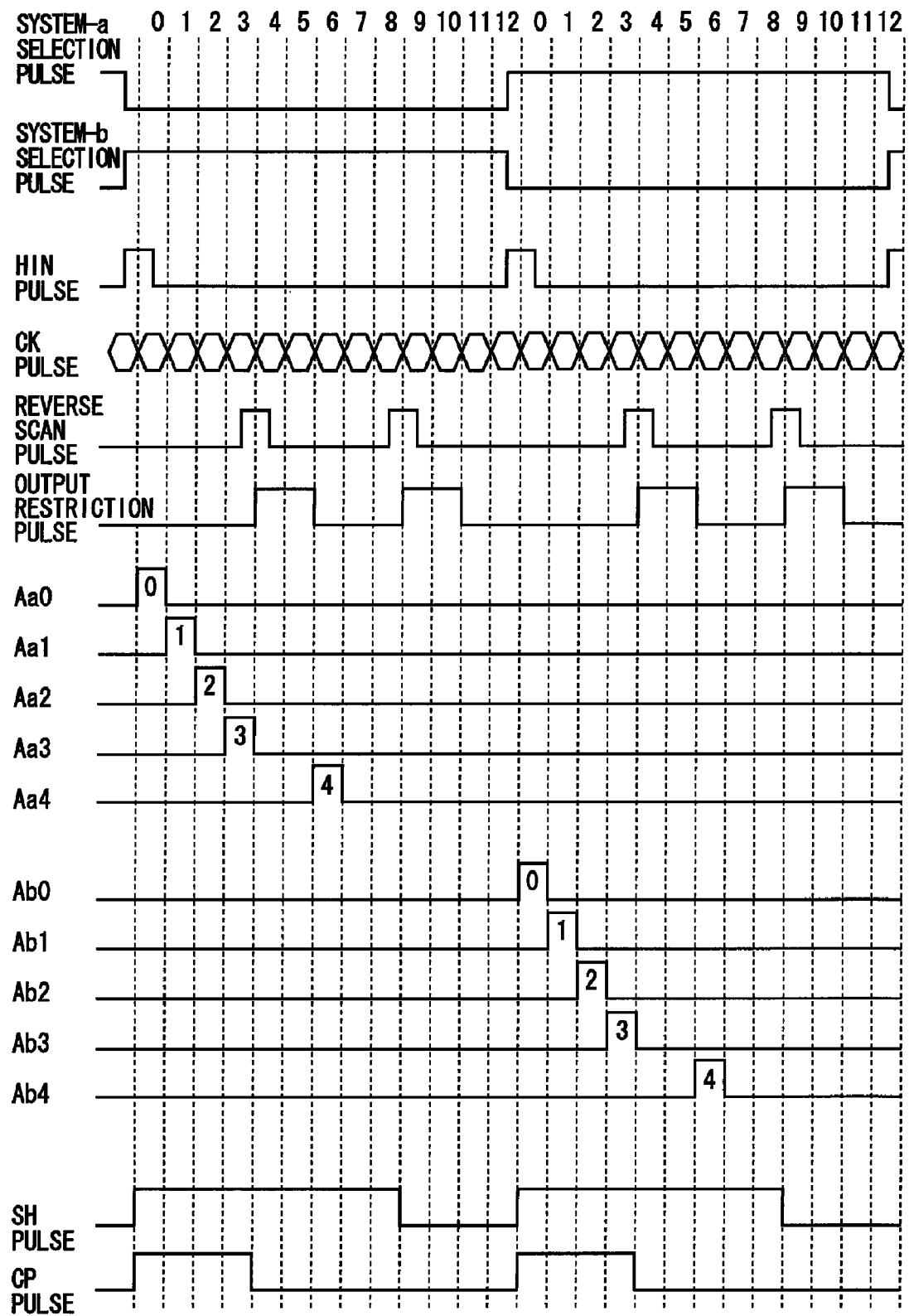
FIG. 28 shows an operation of the column selection decoder 14 pertaining to the seventh embodiment of the present invention.

FIG. 28 shows an operation of the column selection decoder 14 pertaining to the seventh embodiment of the present invention.

The column selection decoder 14 starts the shift operation upon data input (HIN pulse) that works as a trigger. When the level of the system-a selection pulse is low and the level of the system-b selection pulse is high, pixel signals are read out from the first row memory, and at the same time, different pixel signals are stored into the second row memory. On the other hand, when the level of the system-a selection pulse is high and the level of the system-b selection pulse is low, pixel signals are stored into the first row memory, and at the same time, different pixel signals are read out from the second row memory.

Described here is an exemplary case where noise is caused by the fall of the SH pulse and the fall of the CP pulse. Therefore, the reverse scan pulse level is designed to become high upon the falls of the SH pulse and the CP pulse. Provided that noise is expected to occur for a certain period, caused by the operation to store pixel signals, the reverse scan pulse designed in the above-described manner allows suspending the readout of pixel signals in column order during that certain period.

Further, the column selection decoder 14 outputs the selective data that selects one of the columns constituting the pixel array 11 when the output restriction pulse level is low, and the non-selective data that selects none of the columns constituting the pixel array 11 when the output restriction pulse level is high. This way it is possible to restrict the external output of unnecessary pixel signals during the readout-standby period.

Eighth Embodiment

The eighth embodiment is different from the sixth embodiment in restricting the external output of pixel signals during the readout-standby period. Other features are the same as those of the sixth embodiment, and the descriptions thereof are thus omitted.

Figure 29:
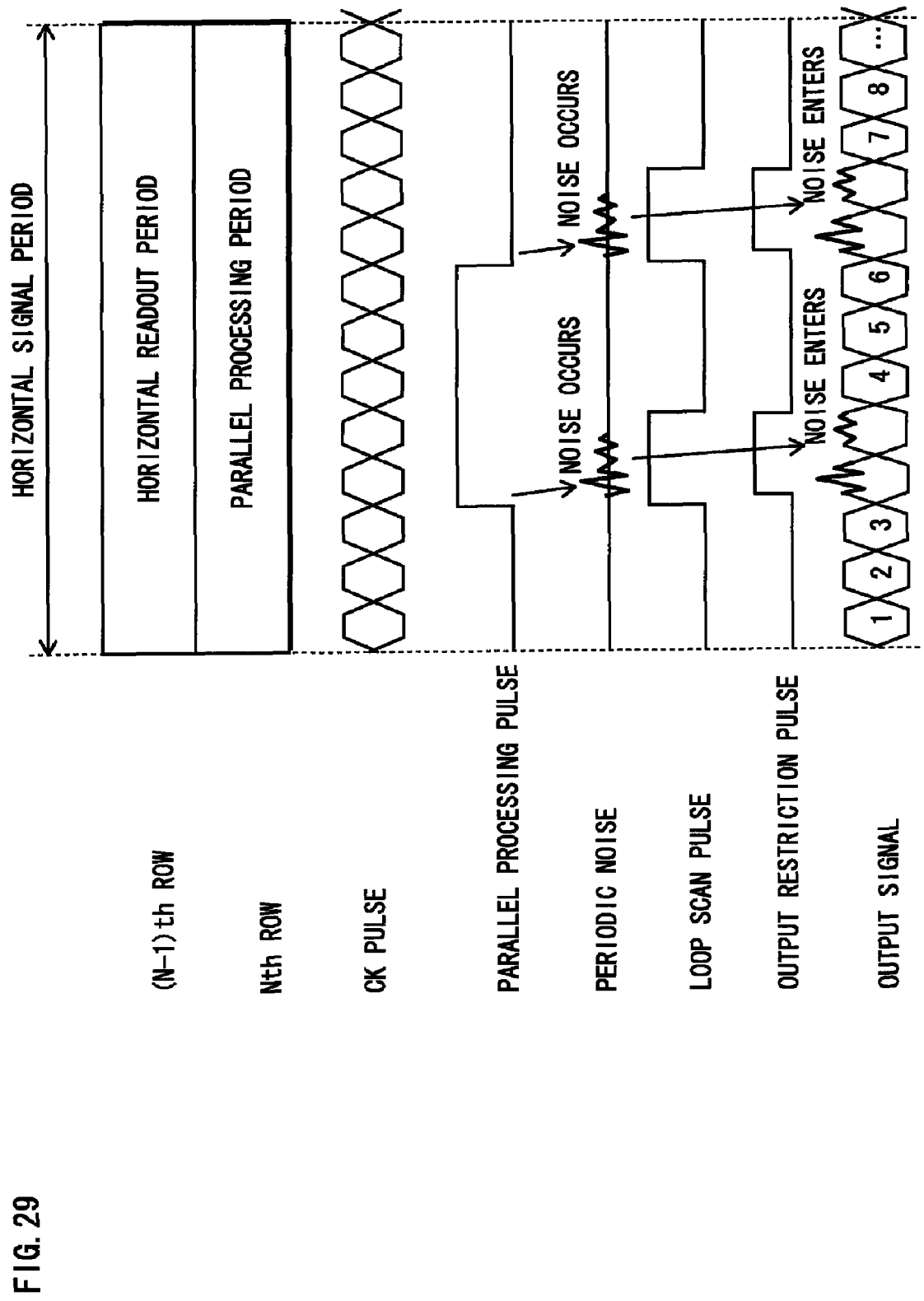
FIG. 29 shows a readout-standby operation pertaining to an eighth embodiment of the present invention, which is to suspend the readout of pixel signals in column order.

FIG. 29 shows a readout-standby operation pertaining to the eighth embodiment of the present invention, which is to suspend the readout of pixel signals in column order.

In the eighth embodiment, pixel signals are externally outputted when the output restriction pulse level is low, and are not externally outputted when the output restriction pulse level is high. The output restriction pulse level is designed to be low during the horizontal readout period except during the readout-standby period, and high during the readout-standby period. With the output restriction pulse designed in the above-described manner, it is possible to restrict the external output of unnecessary pixel signals during the readout-standby period, and hence to reduce the power consumption of a circuit for externally outputting pixel signals and of an image processing system.

Figure 30:
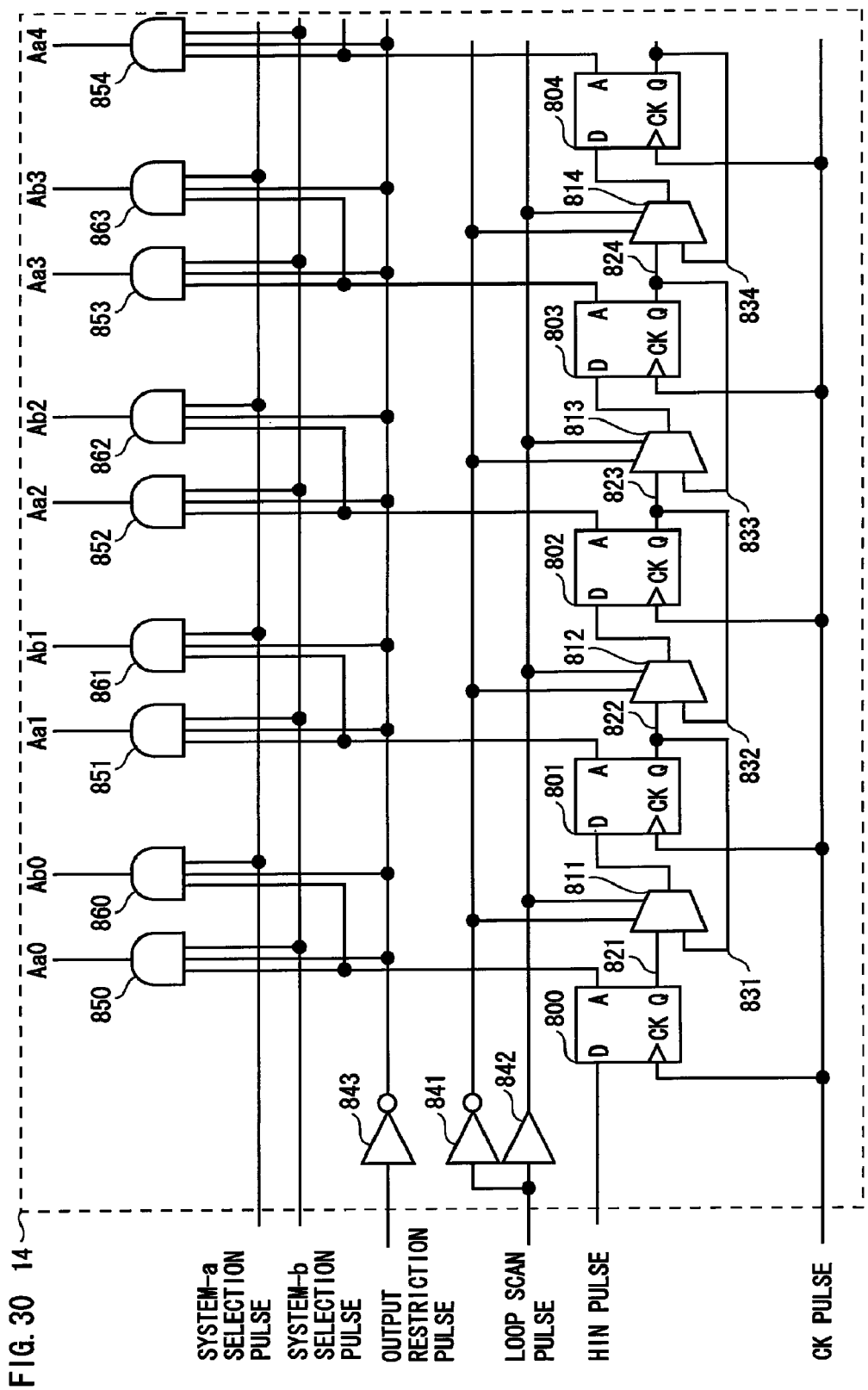
FIG. 30 shows a structure of the column selection decoder 14 pertaining to the eighth embodiment of the present invention.

FIG. 30 shows the structure of the column selection decoder 14 pertaining to the eighth embodiment of the present invention.

This structure is different from that of the sixth embodiment. For example, in observing the first column, the inversion signal of the output restriction pulse is inputted to AND circuits 851 and 861. Note that the output restriction pulse here is the same as the one described in the third embodiment.

A group of AND circuits (850, 851, 852, 853, 854, 860, 861, 862, 863, 864, etc.) and the signal generation subunit, which generates the output restriction pulse to be applied by the timing control unit, function as a non-selective data input subunit that inputs non-selective data to the signal processing unit 15, the non-selective data selecting none of the columns constituting the pixel array 11.

Figure 31:
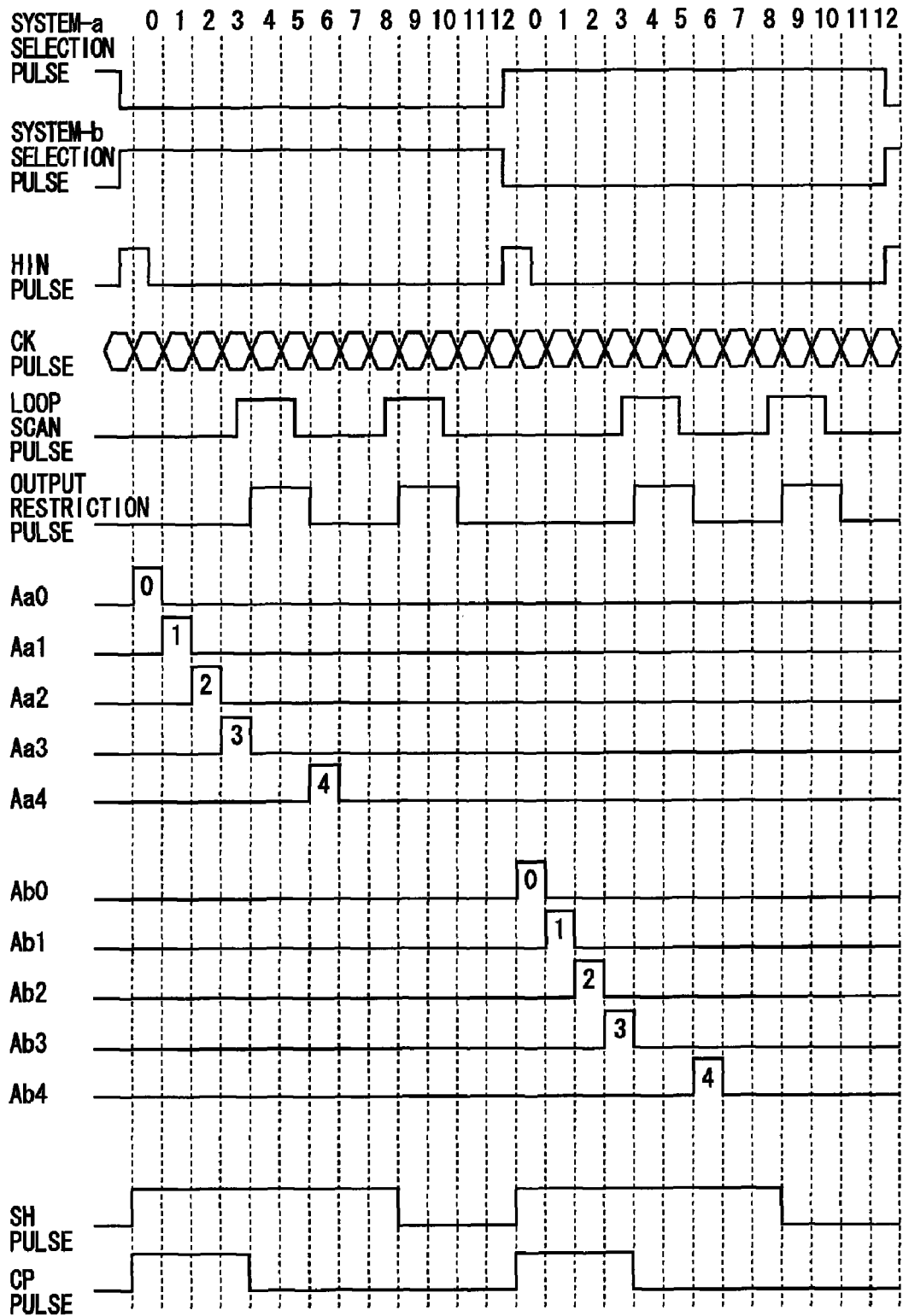
FIG. 31 shows an operation of the column selection decoder 14 pertaining to the eighth embodiment of the present invention.

FIG. 31 shows an operation of the column selection decoder 14 pertaining to the eighth embodiment of the present invention.

The column selection decoder 14 starts the shift operation upon data input (HIN pulse) that works as a trigger. When the level of the system-a selection pulse is low and the level of the system-b selection pulse is high, pixel signals are read out from the first row memory, and at the same time, different pixel signals are stored into the second row memory. On the other hand, when the level of the system-a selection is high and the level of the system-b selection pulse is low, pixel signals are stored into the first row memory, and at the same time, different pixel signals are read out from the second row memory.

Described here is an exemplary case where noise is caused by the fall of the SH pulse and the fall of the CP pulse. Therefore, the loop scan pulse level is designed to become high upon the falls of the SH pulse and the CP pulse. Provided that noise is expected to occur for a certain period, caused by the operation to store pixel signals, the loop scan pulse designed in the above-described manner allows suspending the readout of pixel signals in column order during that certain period.

Further, the column selection decoder 14 outputs the selective data that selects one of the columns constituting the pixel array 11 when the output restriction pulse level is low, and the non-selective data that selects none of the columns constituting the pixel array 11 when the output restriction pulse level is high. This way it is possible to restrict the external output of unnecessary pixel signals during the readout-standby period.

The foregoing has described the solid-state imaging device and camera pertaining to the present invention, based on the above embodiments. These embodiments, however, are not intended to limit the present invention. The following are examples of possible modifications.

Figure 32:
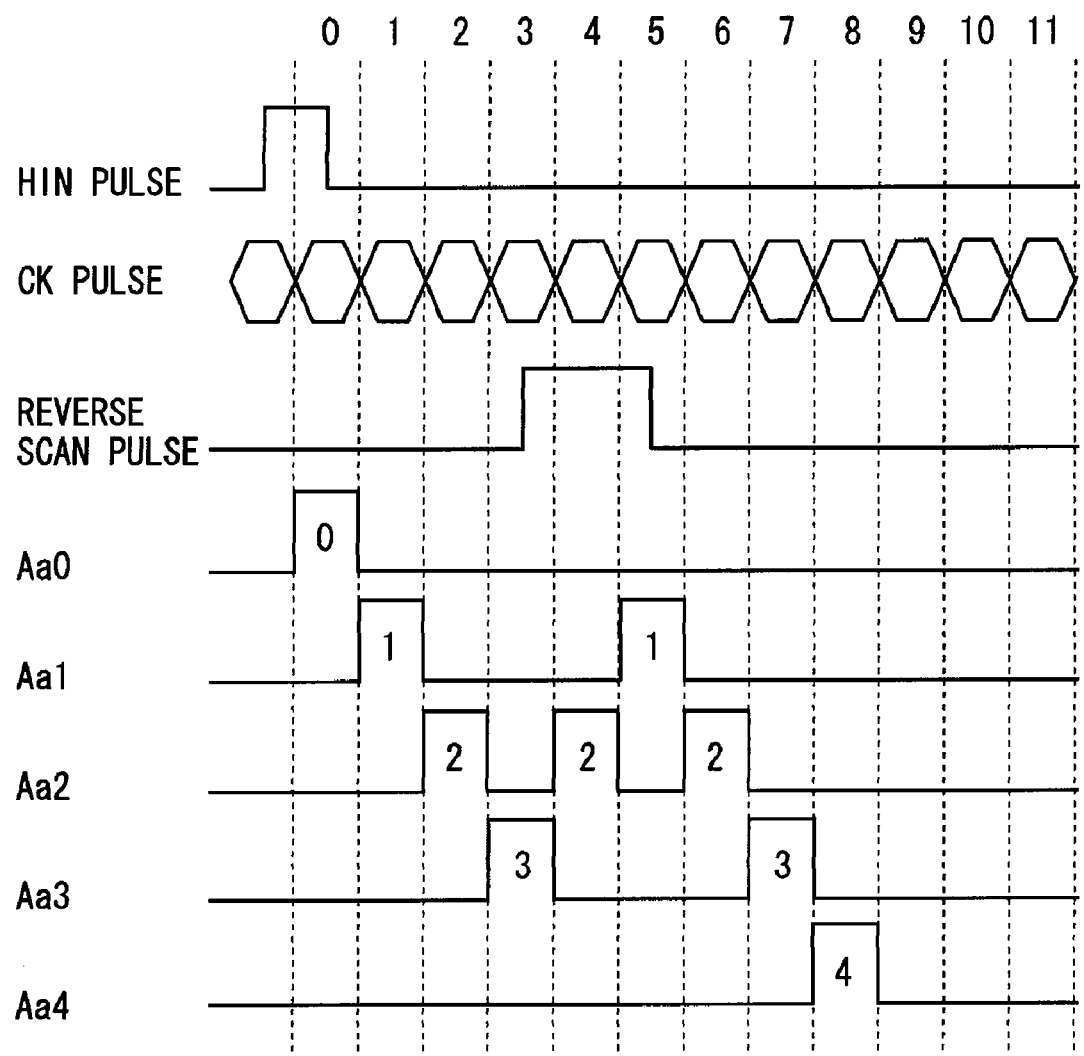
FIG. 32 shows an operation of the column selection decoder 14 having a specification introduced in the first embodiment, with the length of a readout-standby period being extended.
Figure 33:
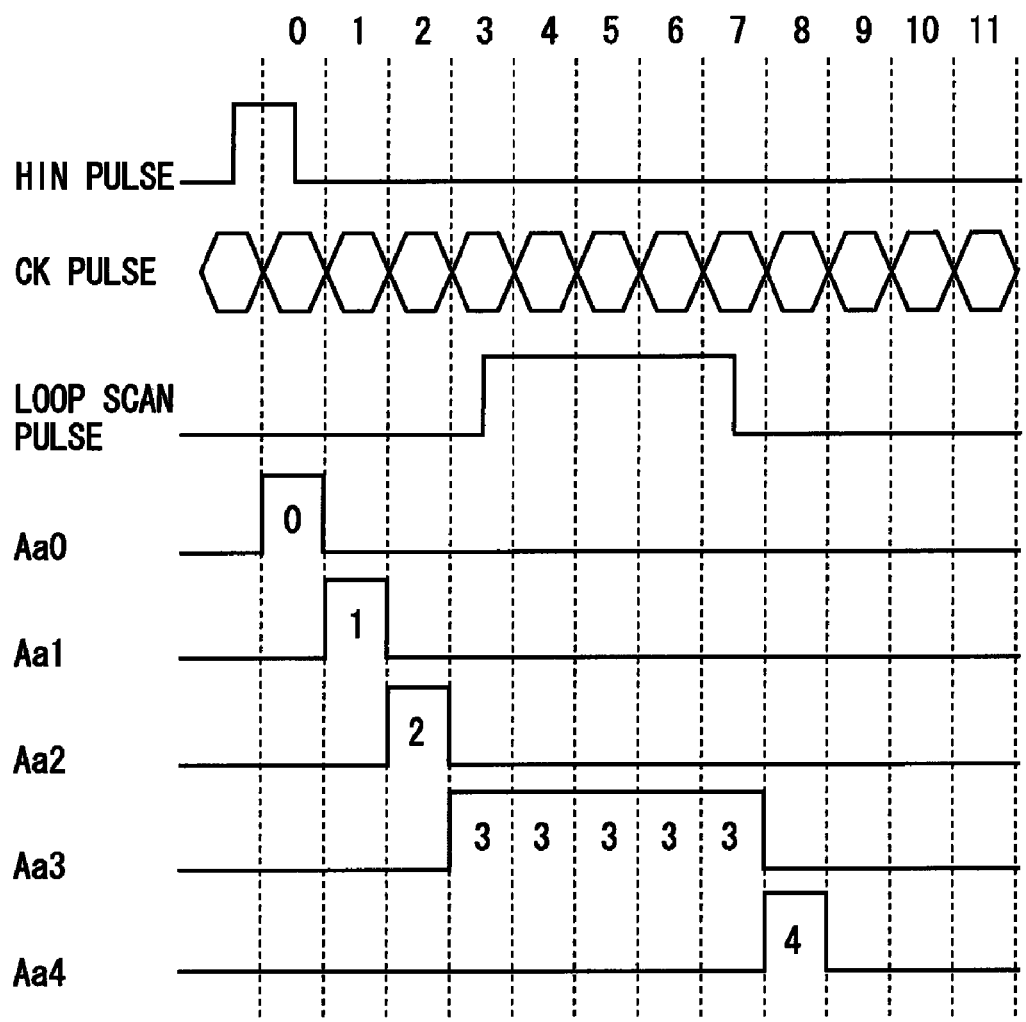
FIG. 33 shows an operation of the column selection decoder 14 having a specification introduced in the first embodiment, with the length of the readout-standby period being extended.

(1) According to the above embodiments, the length of the readout-standby period is equivalent to the length of two pixel cycles. This, however, is not a limitation of the present invention. It is considered that the length of a period for which noise may occur varies depending on various parameters, such as the cause of the noise and a circuit structure. It is thereby desirable that the length of the readout-standby period be set appropriately according to such a period for which the noise may occur. In the examples of FIGS. 32 and 33, the length of the readout-standby period is equivalent to the length of four pixel cycles.

Figure 34:
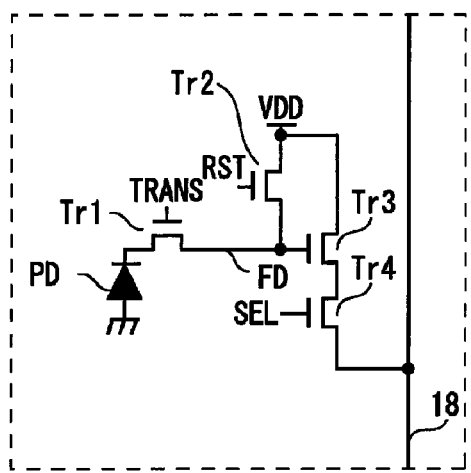
FIG. 34 shows an exemplary modification of a pixel structure.
Figure 35:
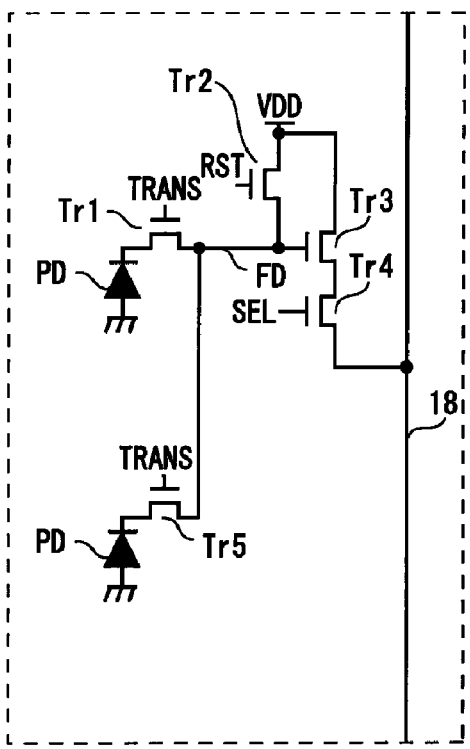
FIG. 35 shows another exemplary modification of the pixel structure.

(2) The structure of each pixel pertaining to the above embodiments is specifically shown in FIG. 1. This pixel structure, however, is not a limitation of the present invention. For example, each pixel may be constructed with four transistors as shown in FIG. 34, or may be constructed such that two photo diodes PD share one floating diffusion FD as shown in FIG. 35. With the structure shown in FIG. 34, it is possible to select a row by controlling a transistor Tr4, without modulating a power supply VDD, and thus to drive the solid-state imaging device in a more simplified manner. Meanwhile, with the structure shown in FIG. 35, it is possible to reduce the number of elements connected to each photodiode, and thus to downsize the solid-state imaging device.

Figure 36:
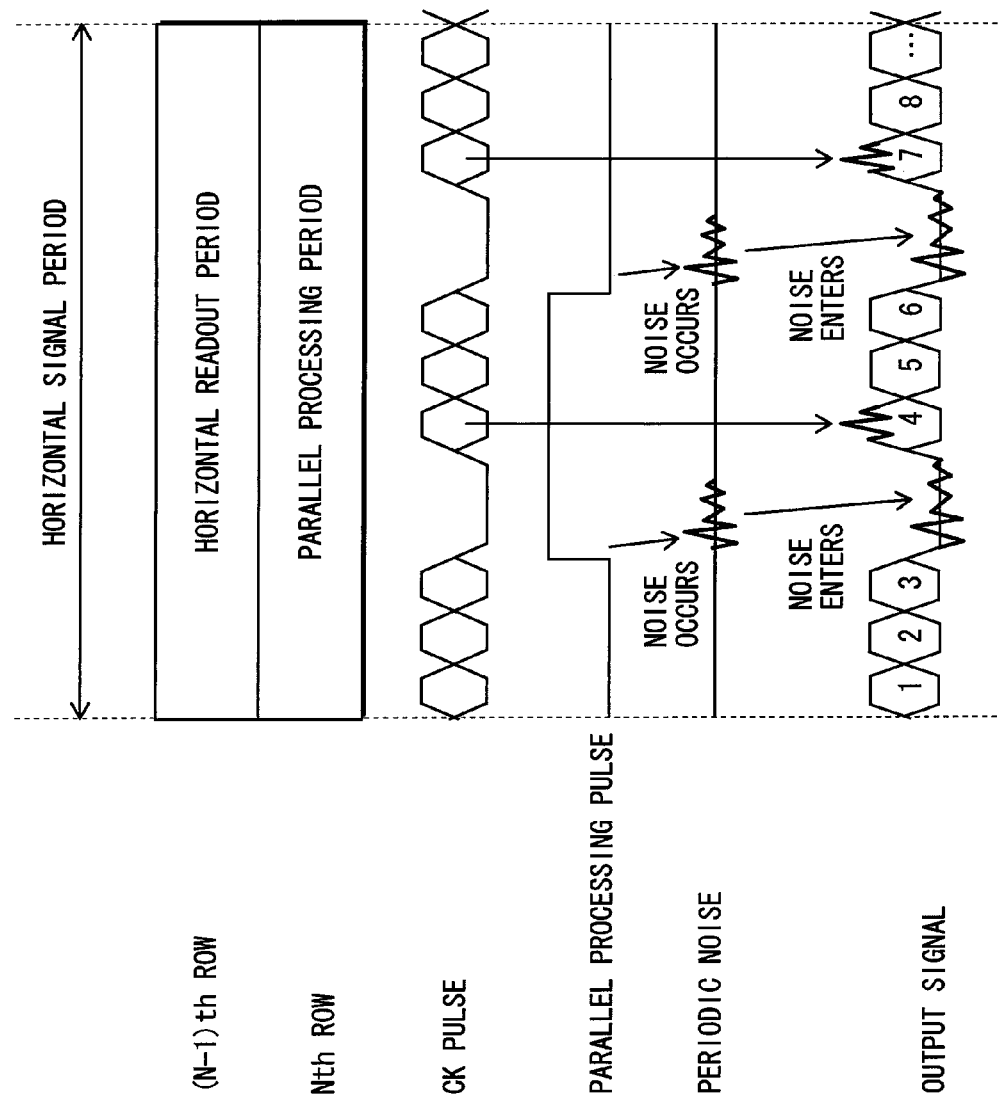
FIG. 36 shows an exemplary modification of a readout-standby operation which is to suspend the readout of pixel signals in column order.
Figure 37:
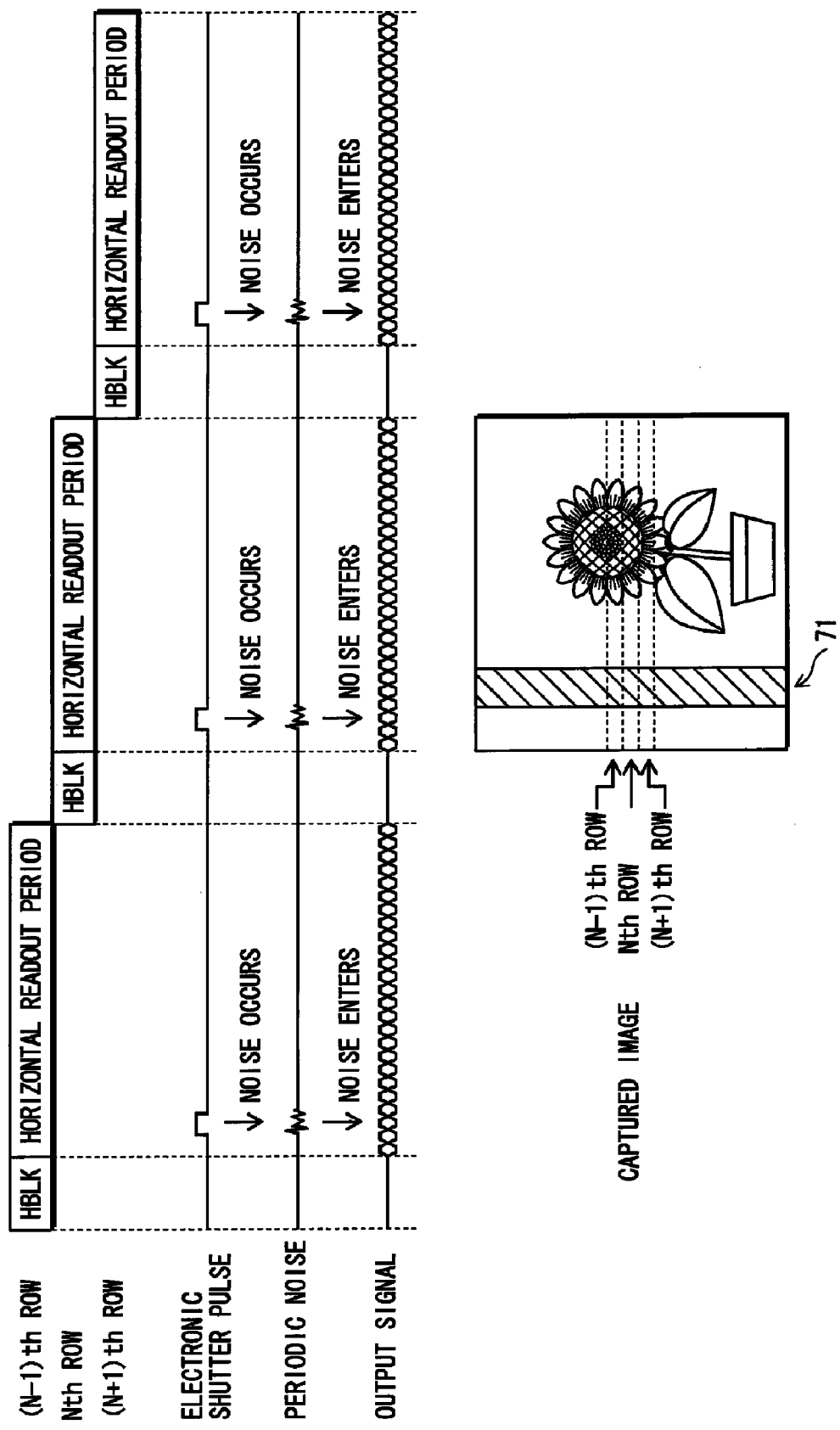
FIG. 37 is a diagram for explaining image noise and the cause of the image noise.

(3) According to the above embodiments, the readout of pixel signals in column order is suspended with the clock pulse still being applied to the shift register. This, however, is not a limitation of the present invention. For example, it is permissible to shut off the application of the clock pulse before pausing the shift operation of the shift register. In this case, however, an abrupt load change occurs upon resuming the application of the clock pulse, causing the power supply voltage to change. This may lead to the opposite effect, triggering noise immediately after resuming the application of the clock pulse (see FIG. 36). If there is a possibility that such an opposite effect may follow, it is desired to suspend the readout of pixel signals in column order with the clock pulse still being applied to the shift register, as shown in the embodiments.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A solid-state imaging device, comprising:
   a pixel array including a plurality of pixels arranged in rows and columns; and
   a readout unit configured to read out pixel signals of the pixels included in the pixel array row by row, wherein:
   the readout unit (i) reads out pixel signals of a row of pixels in column order of the pixel array during a horizontal readout period, except during a readout-standby period that is within the horizontal readout period, and (ii) suspends reading out the pixel signals of the row of pixels in the column order during the readout-standby period, and
   the readout unit includes:
   a shift register configured to (i) store therein selective data that selects a target column which is one of the columns in the pixel array, and (ii) selectively shift the selective data in one of (a) a forward direction that corresponds to the column order and (b) a reverse direction that is opposite to the forward direction;
   an output subunit configured to externally output, out of the pixel signals of the row of pixels, a pixel signal of one of the row of pixels that is in the target column selected by the selective data stored in the shift register; and
   a shift register control subunit configured to cause the shift register to shift the selective data in (i) the forward direction during the horizontal readout period, except during the readout-standby period,(ii) the reverse direction during a period that is equivalent to half of the readout-standby period, and (iii) the forward direction during a period that is equivalent to the other half of the readout-standby period.

2. The solid-state imaging device of claim 1, wherein the readout-standby period includes at least a period for which noise affecting quality of the pixel signals is expected to occur.

3. The solid-state imaging device of claim 1, wherein the output subunit externally outputs the pixel signal of one of the row of pixels that is in the target column, upon receiving an input of the selective data stored in the shift register, and the readout unit further includes a non-selective data input subunit configured to, during the readout-standby period, input non-selective data instead of the selective data to the output subunit, the non-selective data selecting none of the columns in the pixel array.

4. The solid-state imaging device of claim 1, wherein during the horizontal readout period, the readout unit reads out the pixel signals of the row of pixels that have been stored in one of a first memory and a second memory, while concurrently storing pixel signals of another row of pixels into the other one of the first memory and the second memory, and the readout-standby period includes at least a period for which noise is expected to occur caused by an operation to store the pixel signals of another row of pixels.

5. A camera including a solid-state imaging device and an image processing unit; wherein the solid-state imaging device comprises:
   a pixel array including a plurality of pixels arranged in rows and columns; and a readout unit configured to read out pixel signals of the pixels included in the pixel array row by row, wherein:
   the readout unit (i) reads out pixel signals of a row of pixels in column order of the pixel array during a horizontal readout period, except during a readout-standby period that is within the horizontal readout period, and (ii) suspends reading out the pixel signals of the row of pixels in the column order during the readout-standby period, and
   the image processing unit discards, out of the pixel signals of the row of pixels read out by the readout unit, one or more pixel signals that are read out during the readout-standby period, and
   the readout unit includes:
   a shift register configured to (i) store therein selective data that selects a target column which is one of the columns in the pixel array, and (ii) selectively shift the selective data in one of (a) a forward direction that corresponds to the column order and (b) a reverse direction that is opposite to the forward direction;
   an output subunit configured to externally output, out of the pixel signals of the row of pixels, a pixel signal of one of the row of pixels that is in the target column selected by the selective data stored in the shift register; and
   a shift register control subunit configured to cause the shift register to shift the selective data in (i) the forward direction during the horizontal readout period, except during the readout-standby period, (ii) the reverse direction during a period that is equivalent to half of the readout-standby period, and (iii) the forward direction during a period that is equivalent to the other half of the readout-standby period.

* * * * *